(12) United States Patent
Ichida

(10) Patent No.: US 6,293,881 B1
(45) Date of Patent: Sep. 25, 2001

(54) OPERATING DEVICE FOR VEHICLE COMPONENT ASSEMBLY

(75) Inventor: Tadashi Ichida, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/450,500

(22) Filed: Nov. 30, 1999

(51) Int. Cl.[7] .................................................. F16H 61/00
(52) U.S. Cl. .............................. 474/80; 474/78; 474/81; 474/82
(58) Field of Search .................................. 474/80, 82, 79, 474/81, 78; 74/502.2, 489

(56) References Cited

U.S. PATENT DOCUMENTS

| | | |
|---|---|---|
| 4,352,503 | 10/1982 | Cotter ..................................... 280/238 |
| 5,358,451 | 10/1994 | Lacombe et al. ........................ 474/78 |
| 5,538,270 * | 7/1996 | Gajek et al. ........................... 280/264 |
| 5,701,786 | 12/1997 | Kawakami .......................... 74/502.12 |
| 5,928,103 | 7/1999 | Shoge ..................................... 475/297 |
| 6,159,119 * | 12/2000 | Nakamura et al. ..................... 474/80 |

FOREIGN PATENT DOCUMENTS

| | | |
|---|---|---|
| 0120571 | 10/1984 | (EP) . |
| 0629545 | 12/1994 | (EP) . |

* cited by examiner

Primary Examiner—David A. Bucci
Assistant Examiner—Vicky A. Johnson
(74) Attorney, Agent, or Firm—Shinjyu Global IP Counselors, LLP

(57) ABSTRACT

An operating device is provided for operating a vehicle component assembly. More specifically, the operating device moves a movable member between at least two positions. The operating device especially relates to bicycle components that are actuated by a cable or other mechanical linkage. Basically, the vehicle component assembly has a base member, a movable member, a piston member and an actuating device. The movable member is movably coupled to the base member between at least a first position and a second position. The piston member is operatively coupled to the movable member and fluidly coupled to a supply of pressurized fluid to move the movable member from the first position to the second position. The actuating device has an operating component operatively coupled to a valve mechanism and a mechanical coupling assembly. The valve mechanism is arranged to release pressure in the piston member. The mechanical coupling assembly is operatively coupled between the movable member and the operating component to move the movable member from the second position to the first position upon release of pressure in the piston member by the control valve. The mechanical coupling assembly is further arranged to hold the movable member in the first position against the pressure in the piston member.

37 Claims, 18 Drawing Sheets

OPERATING DEVICE FOR VEHICLE COMPONENT ASSEMBLY

BACKGROUND OF THE INVENTION

1. Field of the Invention

This invention generally relates to an operating device for a vehicle component assembly. More specifically, the present invention relates to an operating device that moves a movable member of a vehicle component assembly between at least two positions. The present invention especially relates to bicycle components that are actuated by a cable or other mechanical linkage.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

For example, the front and rear shifting assemblies are often redesigned to make them easier to operate. A shifting assembly or unit has a plurality of gears which are used on a bicycle in order to climb hills more easily, or to ride faster on flat ground. The shifting unit or assembly generally has a shift control component that the rider uses to make a shift and a shift mechanism that is linked to the shift control component by a control cable.

The shift control component has, for example, two shift levers and a cable winding mechanism that rotates via a ratchet mechanism when the shift levers are operated. The shift mechanisms come in internal and external types. An external shift mechanism has a plurality of sprockets that are set up parallel to each other and that have different numbers of teeth, and a derailleur that moves back and forth in the axial direction of the sprocket for guiding and shifting the chain between sprockets. The derailleur has a mounting component that is mounted to the bicycle frame and a chain guide component that moves with respect to the mounting component for guiding the chain in the shift direction.

With conventional shift units or assemblies, operation of one of the shift lever causes the cable winder to rotate via the ratchet mechanism in one direction by one gear. As a result, the cable is wound around the cable winder, and a shift is made by the shift mechanism from one gear to the next gear. Operation of the other shift lever causes the ratchet mechanism to be released and the cable winder to rotate in the other direction by one gear. As a result, the cable that was wound on the cable winder is played out, and a shift is made in the opposite direction by the shift mechanism.

Generally, front and rear derailleurs include a fixed member nonmovably secured to a bicycle frame, and a movable section supported to be movable relative to the fixed member. Typically, the fixed member of a front derailleur is a tubular clamping member that is secured to the seat tube. Alternatively, the fixed member of a front derailleur is sometimes coupled to the bottom bracket. A rear derailleur is fixed to the frame by a bracket axle assembly or a derailleur hanger.

The movable section of the front or rear derailleur includes a chain guide. The movable section is movable relative to the fixed member by pulling a shift control cable. In particular, the movable section and fixed member usually are interconnected through pivotal links. The control cable is connected to one of the pivotal links to apply a torque thereto, thereby causing the links to move the movable section. The control cable is fixedly coupled to the link in such a position that an operating force is applied to the control cable. This force on the cable is converted into a link swinging torque.

An internal shift mechanism, on the other hand, has a plurality of transmission mechanisms of different gear ratios that are provided inside the rear wheel hub. A controller is moved back and forth in the hub axial direction to select one of the plurality of transmission mechanisms. The internal shift mechanism is typically operated by a cable from a shifting device.

Whether an external shift mechanism or an internal shift mechanism is used, a return spring is utilized to act against the cable. In other words, when one of the levers is pushed to release the control cable, slack occurs in the control cable. The slack is taken up by the return spring. Accordingly, when the other lever is pushed, his means that the rider must push the lever against the return spring. This will cause the rider to exert additional force to not only pull the cable, but to overcome the biasing force of the return spring.

The majority of the effort expended by a rider during riding, especially during a race, goes into pedaling. Accordingly, an important evaluation of a shift unit or assembly is how much it can reduce the effort the rider must exert to operate the shift levers. In order to reduce the effort the rider must exert to operate the shift levers, the stroke of the shift levers must be shortened and their operating force reduced. However, these two requirements are at odds with each other. For example, the operating force increases if the operating stroke is shortened, and the operating stroke becomes longer if the operating force is reduced. Consequently, with a system whereby a shift is made by winding a cable by means of shift levers, satisfying both of these requirements at the same time is next to impossible.

In view of the above, there exists a need for an operating device for a vehicle component assembly which overcomes the above mentioned problems in the prior art. This invention addresses this need in the prior art as well as other needs, which will become apparent to those skilled in the art from this disclosure.

SUMMARY OF THE INVENTION

One object of the present invention is to provide an operating device for a vehicle component assembly that is easy to operate.

In one embodiment of the present invention, the vehicle component assembly is a front derailleur for a bicycle in which a mechanical coupling such as a cable is used to shift in one direction and a piston member is used to shift in the other direction.

In one embodiment of the present invention, the vehicle component assembly is a rear derailleur for a bicycle in which a mechanical coupling such as a cable is used to shift in one direction and a piston member is used to shift in the other direction.

In one embodiment of the present invention, the vehicle component assembly is an internally geared hub for a bicycle wheel in which a mechanical coupling such as a cable is used to shift in one direction and a piston member is used to shift in the other direction.

In one embodiment of the present invention, the vehicle component assembly is a brake device for a bicycle wheel in which a mechanical coupling such as a cable is used to brake and a piston member is used to release the braking action.

The present invention can basically be carried out by providing an actuating device for a vehicle component that includes an operating mechanism, an indexing mechanism and a valve mechanism. The operating mechanism is coupled to a control element that operates the vehicle component. The indexing mechanism is operatively coupled to the operating mechanism and has at least two positions to selectively maintain the control element in the two positions in response to the operating member. The valve mechanism is operatively coupled to the operating mechanism for opening and closing a fluid passageway in response to the operating mechanism.

The present invention can also be carried out by providing an operated component for a vehicle component that includes a base member, a movable member and a piston member. The movable member is movably coupled to the base member between at least a first position and a second position. The movable member has a mechanical coupling connection coupled to a mechanical coupling assembly to move the movable member from the second position to the first position. The piston member is operatively coupled to the movable member and adapted to movable member be fluidly coupled to a supply of pressurized fluid to move the movable member from the first position to the second position.

The present invention can basically be carried out by providing a vehicle component assembly having a base member, a movable member, a piston member and an actuating device. The movable member is movably coupled to the base member between at least a first position and a second position. The piston member is operatively coupled to the movable member and fluidly coupled to a supply of pressurized fluid to move the movable member from the first position to the second position. The actuating device has an operating component operatively coupled to a valve mechanism and a mechanical coupling assembly. The valve mechanism is arranged to release pressure in the piston member. The mechanical coupling assembly is operatively coupled between the movable member and the operating component to move the movable member from the second position to the first position upon release of pressure in the piston member by the control valve. The mechanical coupling assembly is further arranged to hold the movable member in the first position against the pressure in the piston member.

The present invention can also be carried out by performing the steps of providing an operated component having a movable portion that moves between a first position and a second position; providing an actuating device operatively coupled to the operated component to move the movable portion between the first and second positions; supplying pressurized fluid from a supply of pressurized fluid to a piston that is operatively coupled to the movable portion of the operated component such that pressure in the piston applies a biasing force on the movable portion to bias the movable portion from the first position to the second position; and releasing pressure in the piston and moving a mechanical coupling portion operatively coupled to the movable portion of the operated component to move the movable portion from one of the first and second positions to the other of the first and second positions.

Preferably, the mechanical coupling portion is a flexible cable having a first end coupled to the movable portion of the operated component and a second end coupled to the actuating device. Moreover, the operated component preferably has at least one intermediate position located between the first and second positions.

In the preferred embodiments, the actuating device includes an indexing mechanism with a cable release member and a cable pulling member operatively coupled to the operated component by the cable. The cable pulling member has a switch that is movable between an open position and a closed position The switch is preferably arranged on the cable pulling member such that the switch can be operated during movement of the cable pulling member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
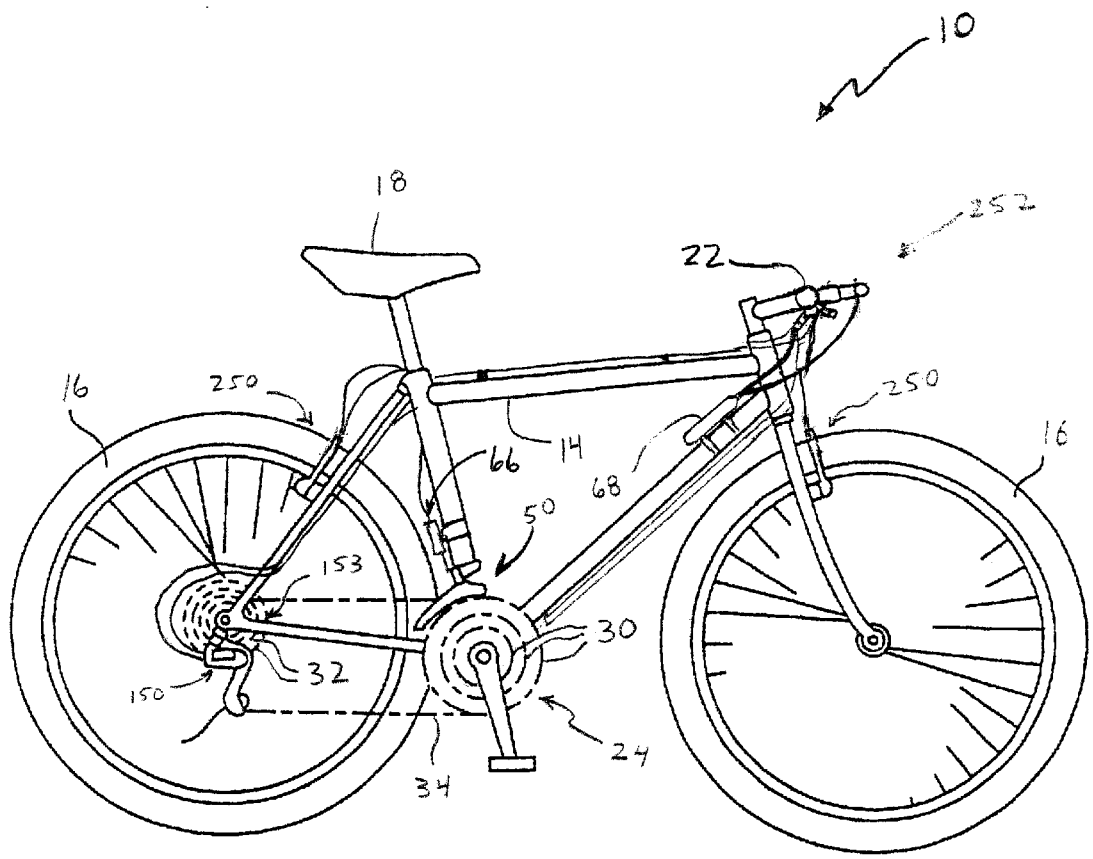
FIG. 1 is a right side elevational view of a bicycle with an operating device used in conjunction with a bicycle component in accordance with a preferred embodiment of the present invention.

Referring initially to FIG. 1, a bicycle 10 is illustrated with vehicle component assemblies installed thereon in accordance with preferred embodiments of the present invention as discussed below. As used herein, the following directional terms "forward, rearward, upward, above, downward, vertical, horizontal, below and transverse" as well as any other similar directional terms refer to those directions of a bicycle in its normal riding position, in which the vehicle component assemblies are attached. Accordingly, these terms, as utilized to describe the vehicle component assemblies herein should be interpreted relative to bicycle 10 in its normal riding position.

Bicycle 10 is preferably a conventional bicycle with a bicycle frame 14 with front and rear wheels 16, a seat 18, a handlebar 22 and a drive train component 24 for propelling bicycle 10. Drive train component 24 basically includes a plurality of front sprockets or gears 30, a plurality of rear sprockets or gears 32 and a chain 34. Drive train component 24 also includes a front shifting component or assembly 40 for moving chain 34 between front gears 30 and a rear shifting component or assembly 42 for moving chain 34 between rear gears 32. Preferably, front and rear brake components or assemblies 44 are mounted to bicycle 10 in a conventional manner for stopping or decreasing the speed of rotation of wheels 16. Bicycle 10 and its various components are well known in the art. Thus, bicycle 10 and its various components will not be discussed or illustrated in detail herein except as needed to explain the present invention.

Basically, the present invention is directed to cable operated components of a bicycle such as front shifting component or assembly 40, rear shifting component or assembly 42 and front and rear brake component 44. Front shifting component or assembly 40 is diagrammatically illustrated in FIG. 3, while rear shifting component or assembly 42 is diagrammatically illustrated in FIG. 12. One of the front and rear brake component 44 is diagrammatically illustrated in FIG. 17, while the other of the front and rear brake component 44 is identical, but mounted in a different location on frame 14. These vehicle components or assemblies are designed such that a compressed fluid such as compressed air is utilized to ease operation thereof. Of course, it will be obvious to one of ordinary skill in the art from this disclosure that the present invention can be utilized in other types of vehicle components or assemblies that utilize a cable or other mechanical linkage to move a movable member between at least two positions.

Front Shifting Component

Turning first to FIGS. 1–11, front shifting component or assembly 40 basically includes an operated component (front derailleur assembly) 50 and an actuating device (shifting device) 52. Front derailleur assembly 50 is operatively coupled to actuating device 52 for shifting chain 34 between front gears 30. In the preferred embodiment, the bicycle 10 is provided with three front gears. The largest diameter gear will be referred to herein as the top gear, while the gear with the smallest diameter will be referred to as the low gear. The gear between the top gear and the low gear will be referred to herein as the intermediate gear.

Front derailleur assembly 50 is illustrated as being fixedly coupled to the seat post portion of the bicycle frame 14 as best seen in FIGS. 1 and 5–7. Of course, it will be apparent to those skilled in the art from this disclosure that front derailleur assembly 50 can be coupled to other parts of bicycle 10 such as the bottom bracket as needed and/or desired.

Front derailleur assembly 50 basically includes a base or fixed member 54 fixedly coupled to frame 14 and a movable member or chain guide 56 movably coupled to base member 54 via a pair of links 58 and 60. Movable member or chain guide 56 has three gear positions relative to frame 14, which correspond, to the location of front gears 30. In other words, in the illustrated embodiment, movable member or chain guide 56 has a low end position, a top end position and an intermediate position therebetween. Preferably, the three positions locate the movable portion at distances $d_1$, $d_2$ and $d_3$ from frame 14 to shift the chain 34 onto a desired front sprocket 30.

Actuating device (shifting device) 52 basically includes an operating portion or mechanism 62, a control element or cable 64, a piston member 66 and a supply of pressurized fluid 68. Basically, actuating device 52 utilizes control cable 64 and piston member 66 to move movable member or chain guide 56 of front derailleur assembly 50 between its three gear positions. Specifically, piston member 66 acts as a biasing member to take up slack in control cable 64 to move movable member or chain guide 56 from the top end position to the low end position. Control cable 64 compresses piston member 66 to move movable member or chain guide 56 from the low end position (i.e., distance $d_1$ from the frame) to the top end position (i.e., distance $d_3$ from the frame) once the pressure in piston member 66 has been released.

Preferably, control cable 64 is a conventional control cable that has a sheath or outer casing 64b allowing sliding movement of inner wire 64a therein. Accordingly, the details of control cable 64 will not be discussed or illustrated in detail herein.

Figure 5:
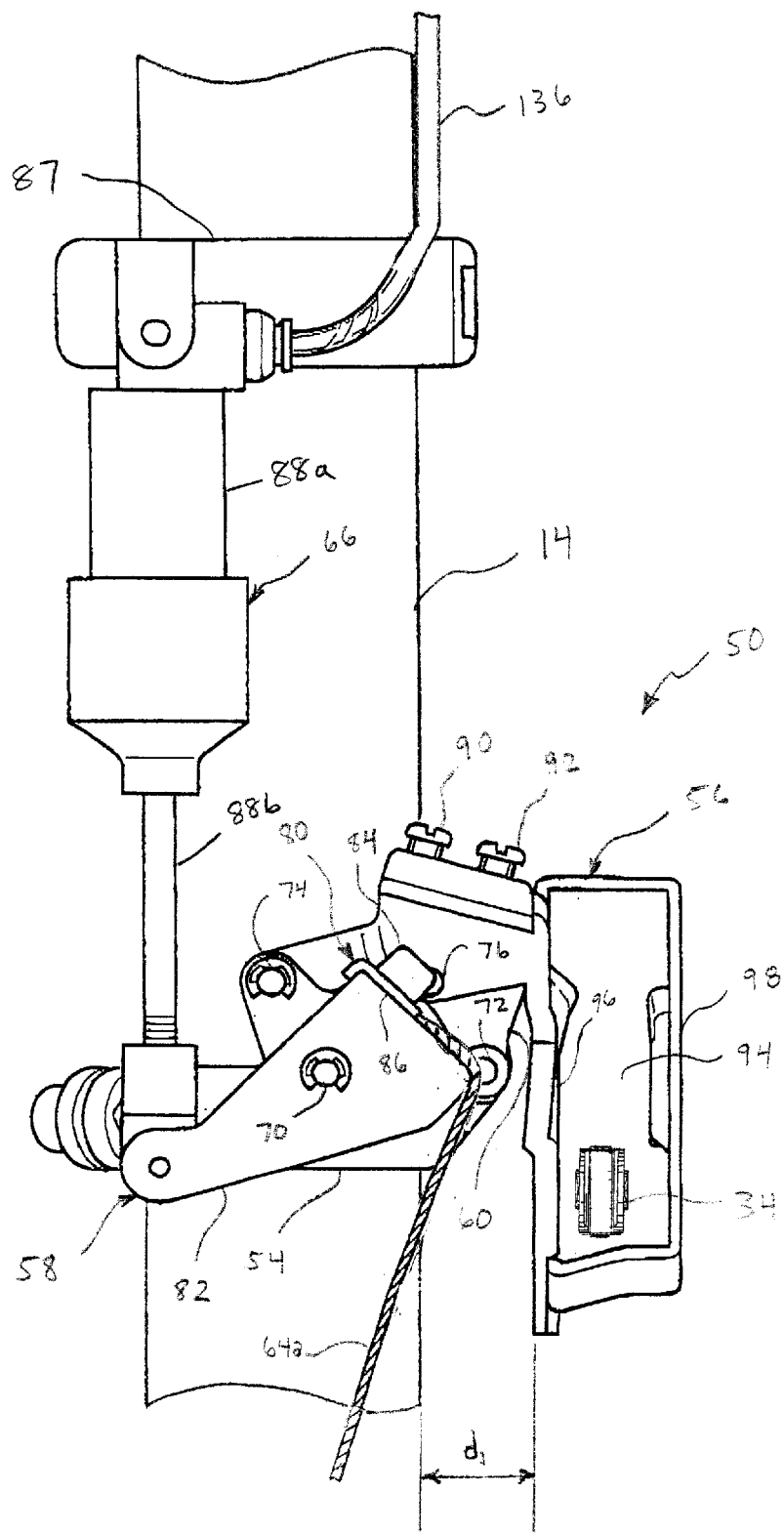
FIG. 5 is a rear elevational view of a front derailleur assembly mounted on a bicycle frame illustrated in FIG. 1 showing a first position of a movable portion in accordance with a preferred embodiment of the present invention.
Figure 6:
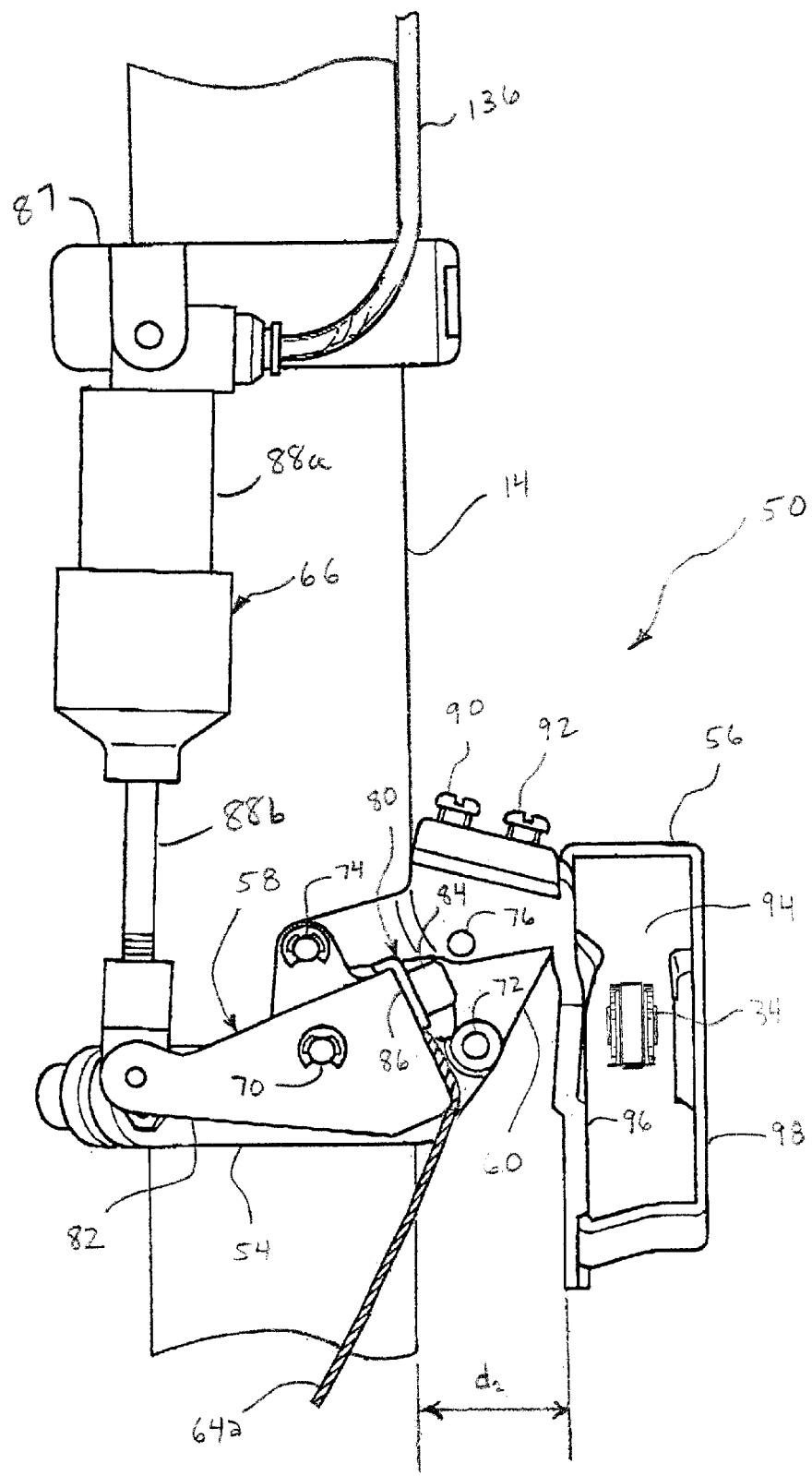
FIG. 6 is a rear elevational view of the front derailleur assembly mounted on a bicycle frame illustrated in FIGS. 1 and 5 showing a second operating position of the movable portion in accordance with a preferred embodiment of the present invention.
Figure 7:
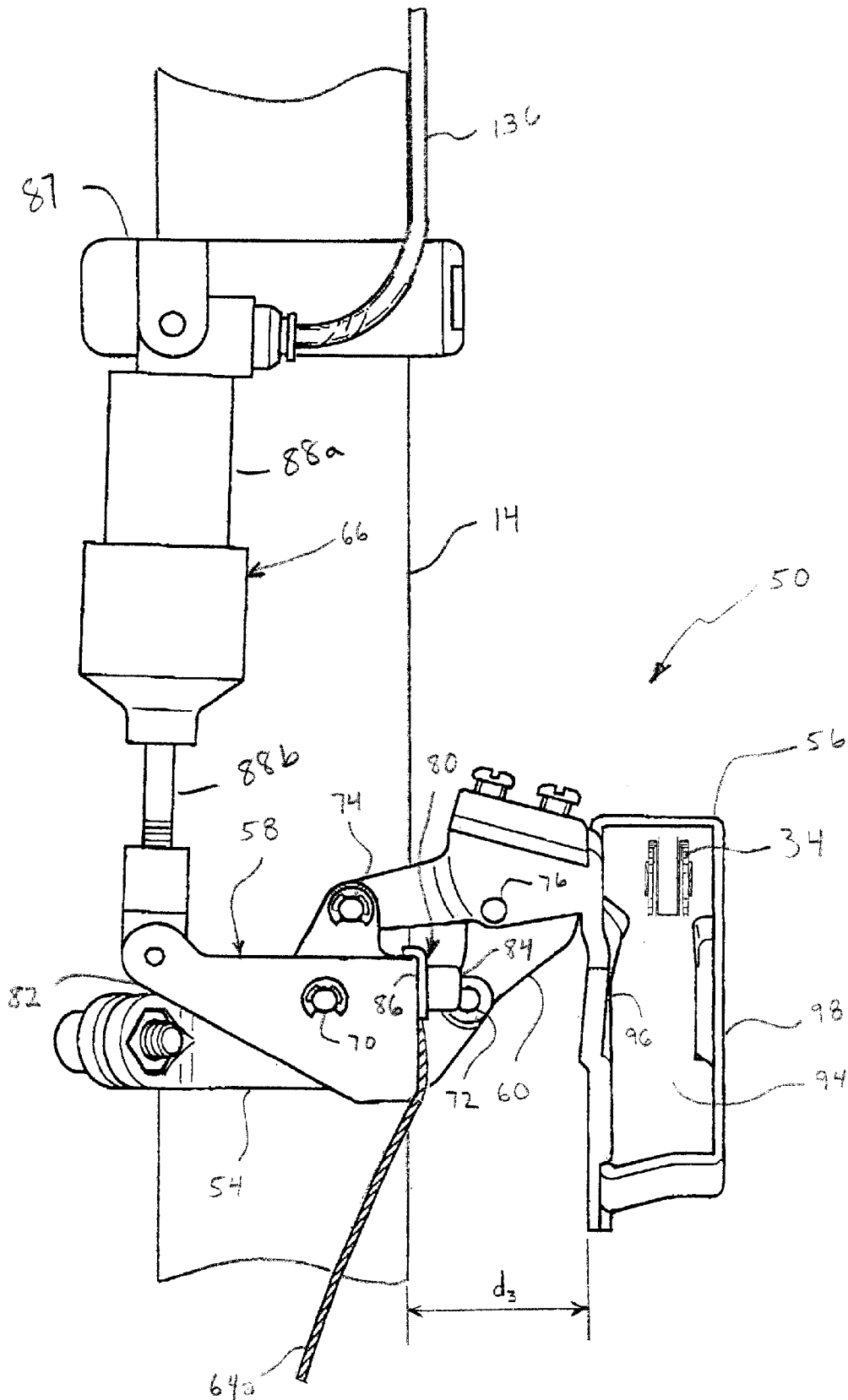
FIG. 7 is a rear elevational view of the front derailleur assembly mounted on a bicycle frame as illustrated in FIGS. 1, 5 and 6 showing a third operating position of the movable portion in accordance with a preferred embodiment of the present invention.
Figure 8:
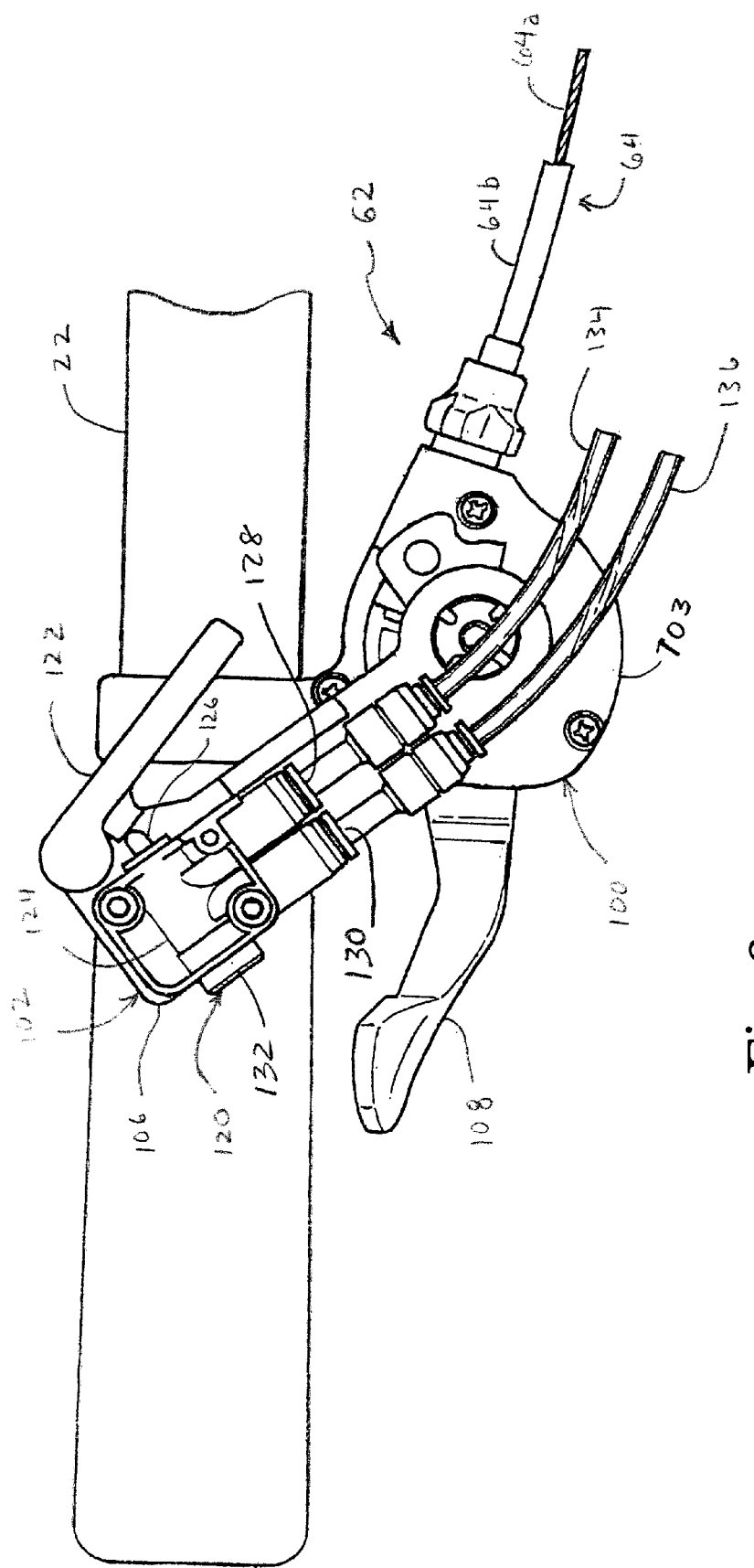
FIG. 8 is an enlarged bottom plan view of a front derailleur actuating device mounted on a handlebar portion of a bicycle showing a first actuating position in accordance with a preferred embodiment of the present invention.

Referring to FIGS. 5–7, front derailleur assembly 50 will now be discussed in more detail. Base member 54 is preferably clamped directly to the seat post of frame 14. Base member 54 is preferably a conventional clamp and basically includes a pair of C-shaped clamping portions that are pivotally coupled at one of their ends and releasably coupled at their other ends by a fastener. The clamping portions of base member 54 are constructed of a rigid material to secure front derailleur assembly 50 to seat post of frame 14 of bicycle 10. Preferably, clamping portions of base member 54 are constructed of metal. Of course, clamping portions of base member 54 could be constructed of other materials such as a hard rigid plastic material.

Base member 54 includes a pair of pivot pins 70 and 72 for pivotally coupling first ends of links 58 and 60 thereto. The other ends of links 58 and 60 are coupled to movable member or chain guide 56 via pivot pins 74 and 76. Links 58 and 60 together with base member 54 and chain guide 56 form a four-bar linkage assembly. In particular, base member 54 forms a first link between pivot pins 70 and 72, chain guide 56 forms a second link between pivot pins 74 and 76, while links 58 and 60 form the third and fourth links, respectively.

Link 58 has a cable attachment member 80 coupled thereto for attaching control cable 64 thereto. Cable attachment member 80 is preferably formed as a conventional bolt 84 and a wire clamp 86 for attaching the inner wire of cable 64 thereto. Link 58 also has a piston connecting arm 82 with piston member 66 pivotally coupled thereto. Thus, link 58 acts as a control link for chain guide 56.

Control cable 64 and piston member 66 of actuating device 52 control the movements of chain guide 56 and links 58 and 60. Specifically, piston member 66 acts as a biasing member to take up slack in an inner wire 64a of control cable 64 to move movable member or chain guide 56 from the top end position (i.e., distance $d_3$) to the low end position (i.e., distance $d_1$). Inner wire 64a of control cable 64 compresses piston member 66 to move movable member or chain guide 56 from the low end position (i.e., distance $d_1$) to the top end position (i.e., distance $d_3$) once the pressure in piston member 66 has been released. Of course, control cable 64 and piston member 66 can also move chain guide 56 to/from the intermediate position (i.e., distance $d_2$) to/from the top end position or the low end position. Piston member (biasing member) 66 normally biases chain guide 56 in a transverse direction towards the frame of bicycle 10. In other words, when chain guide 56 is closest to the frame of bicycle 10, chain guide 56 holds chain 34 over the sprocket 30 that is closest to seat post of frame 14.

Piston member 66 is fixedly coupled at one end to frame 14 by bracket or mounting member 87 and coupled to link 58 at the other end. Piston member 66 is preferably a conventional piston, which has a cylinder housing 88a forming a chamber with a piston rod 88b movably arranged therein. In particular, the chamber of cylinder housing 88a is fluidly coupled to the supply of pressurized fluid 68. When the chamber of cylinder housing 88a is pressurized, piston rod 88b is forced outwardly from cylinder housing 88a. These outward movements of piston rod 88b causes link 58 to rotate, which in turn moves chain guide 56. When the chamber of cylinder housing 88a is depressurized, piston rod 88b is forced inwardly into cylinder housing 88a by the control cable 64 that rotates link 58. Since the chamber of cylinder housing 88a is depressurized, piston rod 88b is easily retracted to shift chain guide 56. Since piston members such as piston member 66 are well known in the prior art, piston member 66 will not be discussed or illustrated in detail herein.

The upper end of link 60 is provided with a fan-shaped member (not shown) that engages adjustment screws 90 and 92 for limiting movement of chain guide 56 between its retracted position and its extended position. More specifically, the fan member is provided with a low stopping surface and a high stopping surface (not shown). The low stopping surface is designed to engage the free end of low adjustment screw 92, while the high stopping surface is positioned to engage the high adjustment screw 90. Since this is a relatively conventional adjustment mechanism that is well known in the prior art, this adjustment mechanism will not be discussed or illustrated in detail herein.

Movable member or chain guide 56 is preferably constructed of a hard rigid material. For example, chain guide 56 is preferably constructed of metal such as a rigid sheet metal. Chain guide 56 has a chain cage portion for guiding chain 34 and a mounting portion extending for pivotally coupling links 58 and 60 thereto.

The mounting portion of chain guide 56 has a pair of threaded holes for receiving adjustment screws 90 and 92 thereto. Adjustment screw 90 is a top position adjustment screw, while adjustment screw 92 is a low position adjustment screw. Adjustment screws 90 and 92 engage a portion of link 60 as discussed below for controlling the range of movement of chain guide 56. In other words, by individually adjusting the axial extension of adjustment screws 90 and 92 relative to mounting portion of chain guide 56, the retracted (low gear) position and the extended (top gear) position of chain guide 56 are adjusted independently of each other.

The chain cage portion of chain guide 56 has a chain receiving slot 94 formed by a pair of vertical shift plates 96 and 98 that are adapted to engage chain 34 for moving chain 34 in a direction transverse to bicycle 10.

Referring to FIGS. 2–4 and 8–11, operating portion or mechanism 62 of actuating device 52 is a shifting unit, which basically includes a cable control mechanism 100 and a fluid control mechanism 102. Cable control mechanism 100 is designed for pulling and releasing inner wire 64a of control cable 64, which is coupled to front derailleur assembly 50. Fluid control mechanism 102 is designed to pressurize and depressurize piston member 66, which acts as a biasing member to apply a biasing force on front derailleur assembly 50 to take up any slack created in inner wire 64a of control cable 64 by cable control mechanism 100. Thus, cable control mechanism 100 and fluid control mechanism 102 cooperate together to move chain guide 56 via control cable 64 and piston member 66.

Cable control mechanism 100 is basically a conventional shifting device having a housing 103, an indexing mechanism 104, a cable pulling member or lever 106 and a cable releasing member or lever 108. Housing 103 mounts the shifting device to handlebar 22 in a conventional manner. The cable pulling lever 106 and the cable releasing lever 108 are operatively coupled to indexing mechanism 104 for pulling and releasing inner wire 64a of control cable 64. Cable control mechanism 100 is basically a conventional rapid-fire type index shifting device that has been adapted to carry out the present invention. Accordingly, the details of cable control mechanism 100 will not be discussed or illustrated in detail herein.

Figure 11:
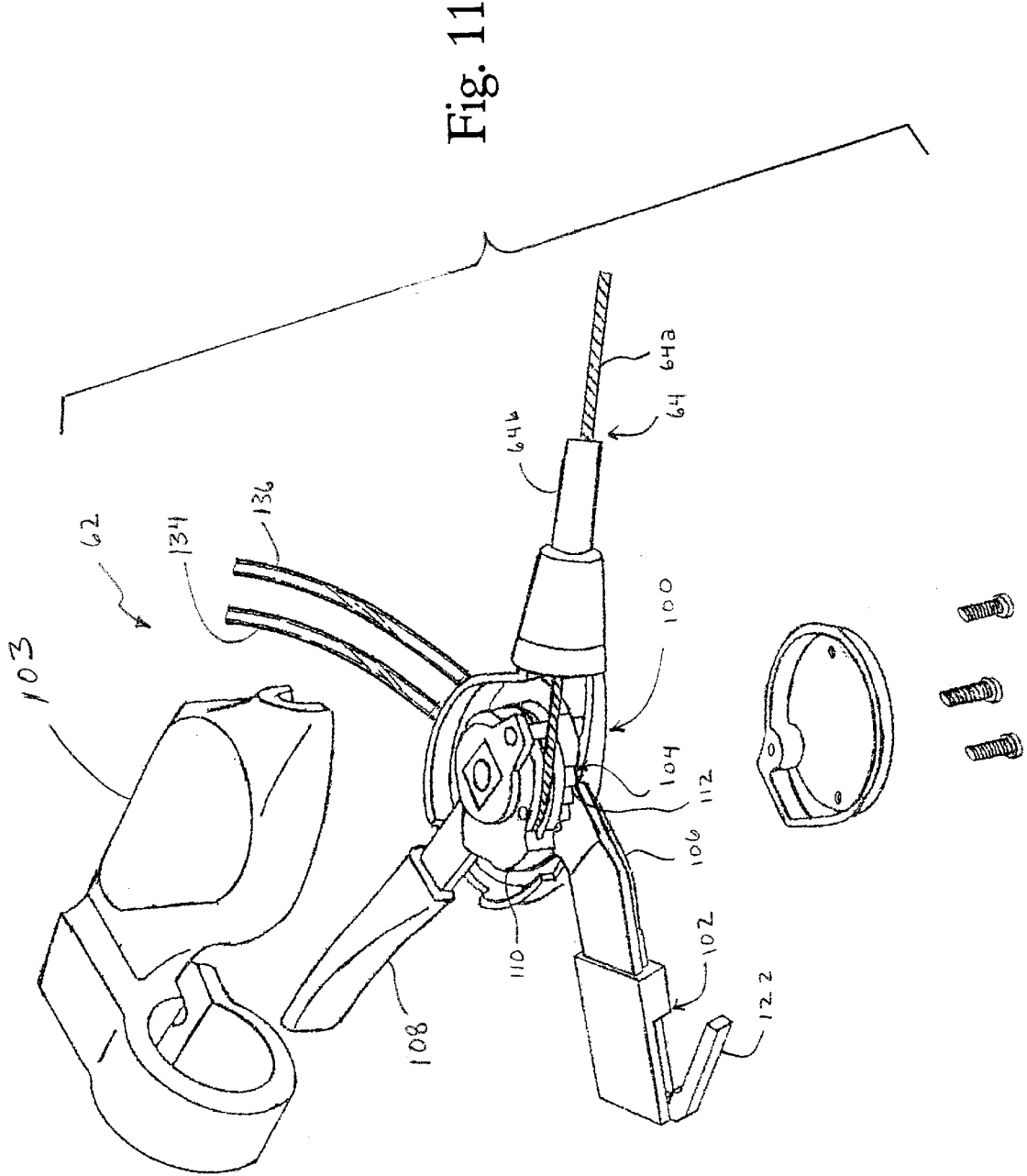
FIG. 11 is an exploded perspective view of the front derailleur actuating device illustrated in FIGS. 8–10 in accordance with a preferred embodiment of the present invention.

Indexing mechanism 104 has a take-up element 110 and a ratchet-type interlock mechanism 112 for winding (pulling) and releasing the inner wire of control cable 64 as seen in FIG. 11. Cable pulling and release members 106 and 108 are interlocked to the take-up element 110 through the ratchet-type interlock mechanism 112 in a conventional manner. This interlock mechanism 112 includes a ratchet-type feed pawl (not shown) for transmitting a pivotal movement of cable pulling lever 106 to the take-up element 110, a positioning pawl (not shown) for retaining the take-up element 110 in a predetermined rotational position, a limiting pawl (not shown) for limiting an unwinding rotation of the take-up element 110, and a release cam (not shown) for disengaging the positioning pawl from the take-up element 110. Shifting the cable pulling and releasing levers 106 and 108 rotate the take-up element 110 rotated to pull or relax the inner wire 64a of control cable 64.

Figure 9:
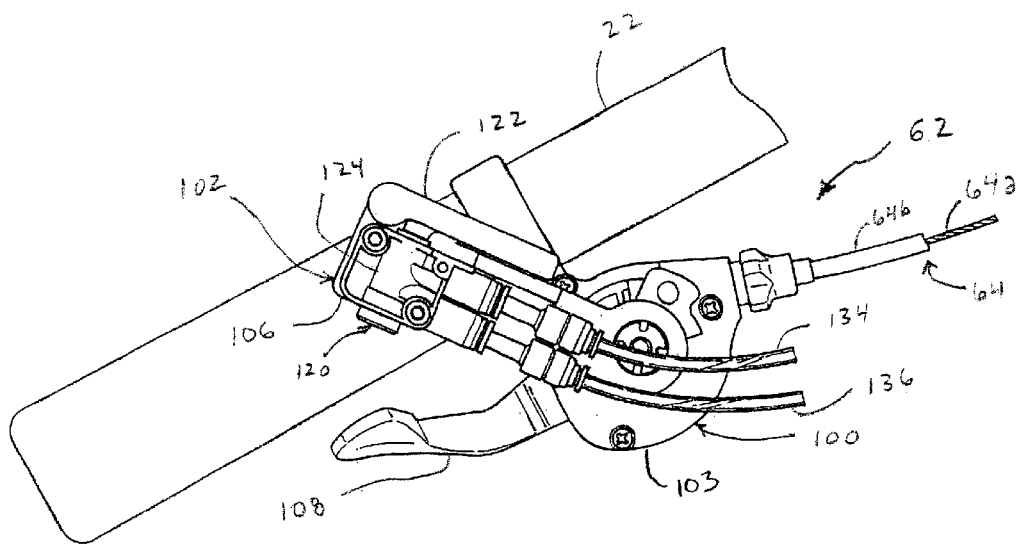
FIG. 9 is a bottom plan view of the front derailleur actuating device illustrated in FIG. 8 showing a second actuating position in accordance with a preferred embodiment of the present invention.
Figure 10:
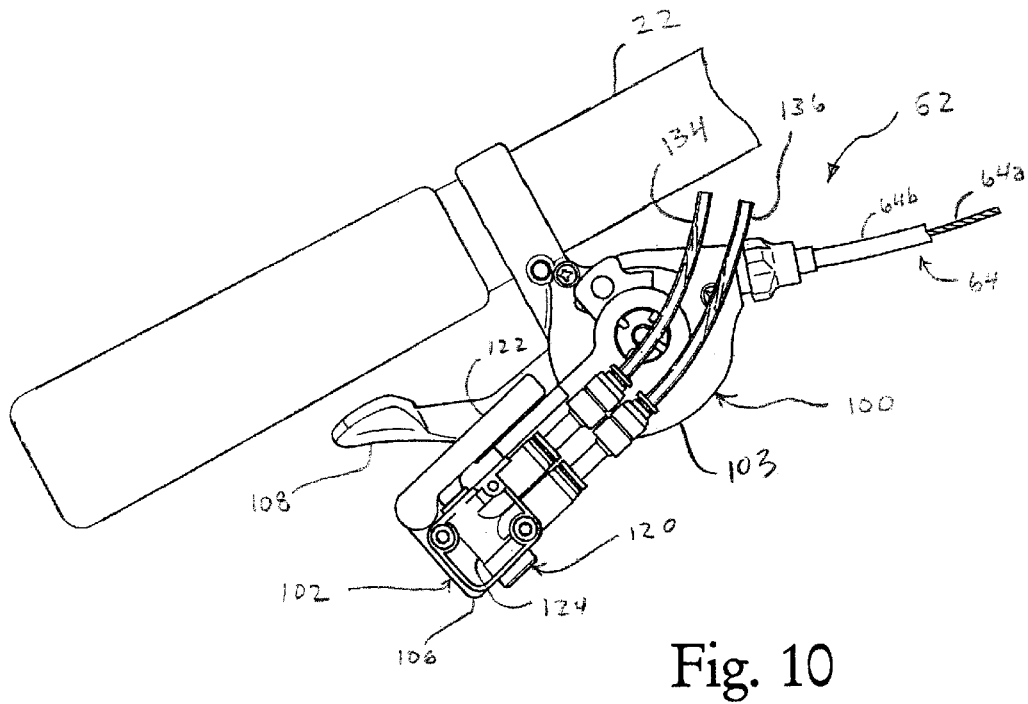
FIG. 10 is a bottom plan view of the front derailleur actuating device illustrated in FIGS. 8 and 9 showing a third actuating position in accordance with a preferred embodiment of the present invention.

For example, when the cable pulling lever 106 is shifted in a first direction from an original position as shown in FIG. 9 to a second position as shown in FIG. 10, the take-up element 110 rotates in a winding direction to take-up or pull the inner wire 64a of control cable 64 and effectively wind a length of inner wire 64a. Cable pulling lever 106 may be released after being operated a predetermined amount necessary for effecting a change of speed. Then, cable pulling lever 106 automatically returns to the original position under the biasing force of return spring (not shown). At this time, despite the return to the original position of the cable pulling lever 106, the take-up element 110 is retained in a position by the ratchet-type interlock mechanism 112 to which the take-up element 110 has been rotated by cable pulling lever 106 to complete the change of speed. Of course, cable pulling lever 106 and the take-up element 110 can be designed such that the inner wire of the control cable 64 is pulled such that the front derailleur assembly 50 moves more than one gear depending upon the length of moving strokes of the cable pulling lever 106.

The cable release lever 108 is shifted in the opposite direction relative to cable pulling lever 106 from an original position. Thereafter, the cable release lever 108 may be released to return to the original position by the biasing force of a return spring (not shown). Then, the take-up element 110 rotates an angle of one pitch in the unwinding direction under the force of an unwinding spring (not shown) to effectively unwind a length of inner wire 64a. A restoring force is provided by piston member 66 on the inner wire 64a of control cable 64 to effectively take-up slack in inner wire 64a of control cable 64 created by the unwinding operation. Consequently, the shifting device unwinds the inner wire of control cable 64 to effect a one-stage change of speed.

Fluid control mechanism 102 is preferably mounted on cable pulling lever 106 for movement therewith as seen in FIGS. 2 and 8–11. Fluid control mechanism 102 basically includes a valve mechanism and an actuating member 122. The valve mechanism 120 has a housing 124 with a valve member 126 movably located therein 120 (schematically illustrated in FIGS. 3 and 4). The housing 124 has an inlet opening or port 128, an outlet opening or port 130, and an exhaust port 132. Inlet opening or port 128 is connected via a conduit or tube 134 to the pressurized fluid 68, while outlet opening or port 130 is fluidly connected by a tube or conduit 136 to the chamber of piston member 66. Thus, valve member 126 control the pressure in the chamber of piston member 66.

Figure 3:
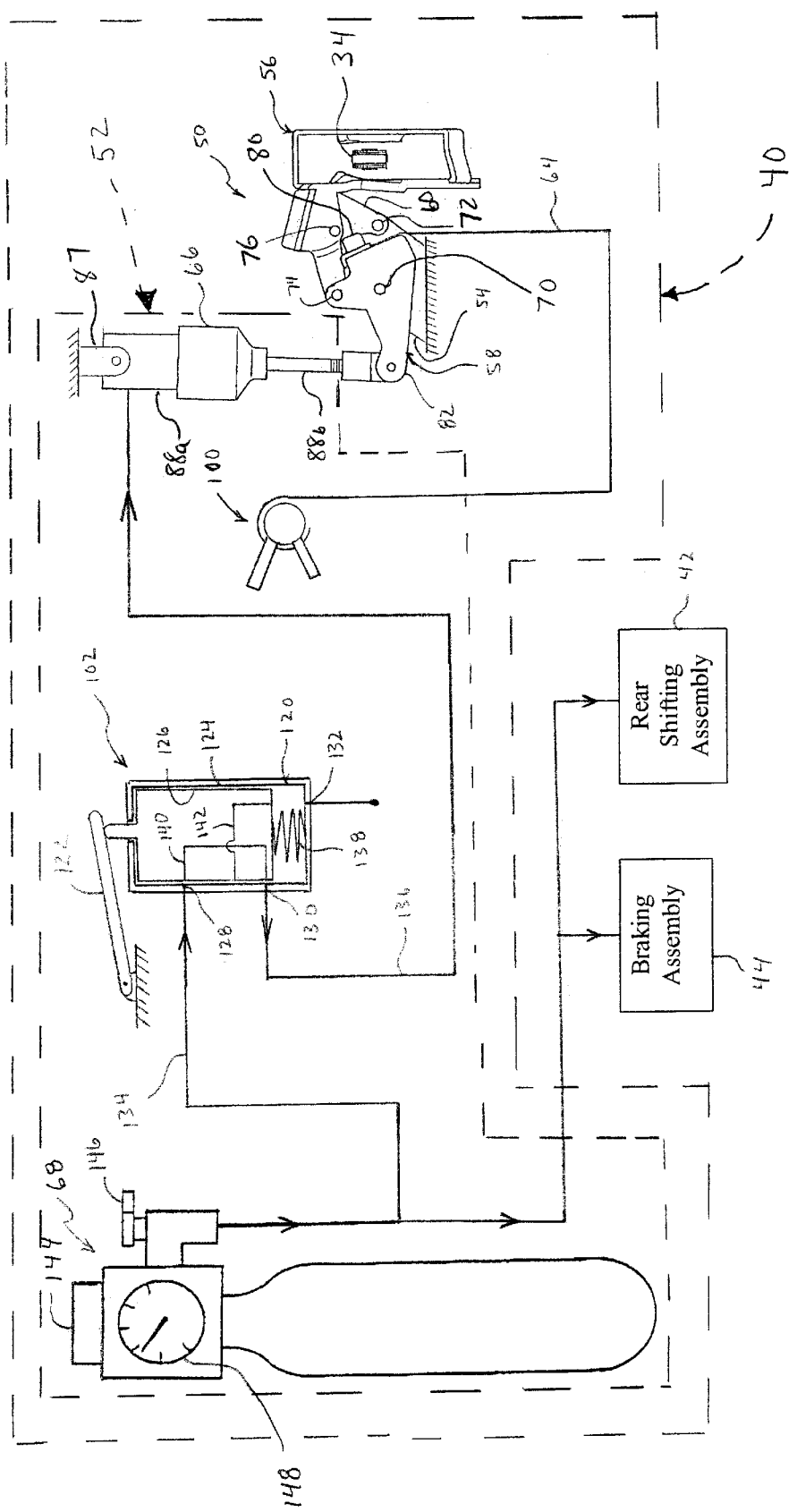
FIG. 3 is a schematic illustration of an actuating device used in conjunction with a front derailleur assembly in accordance with a preferred embodiment of the present invention.
Figure 4:
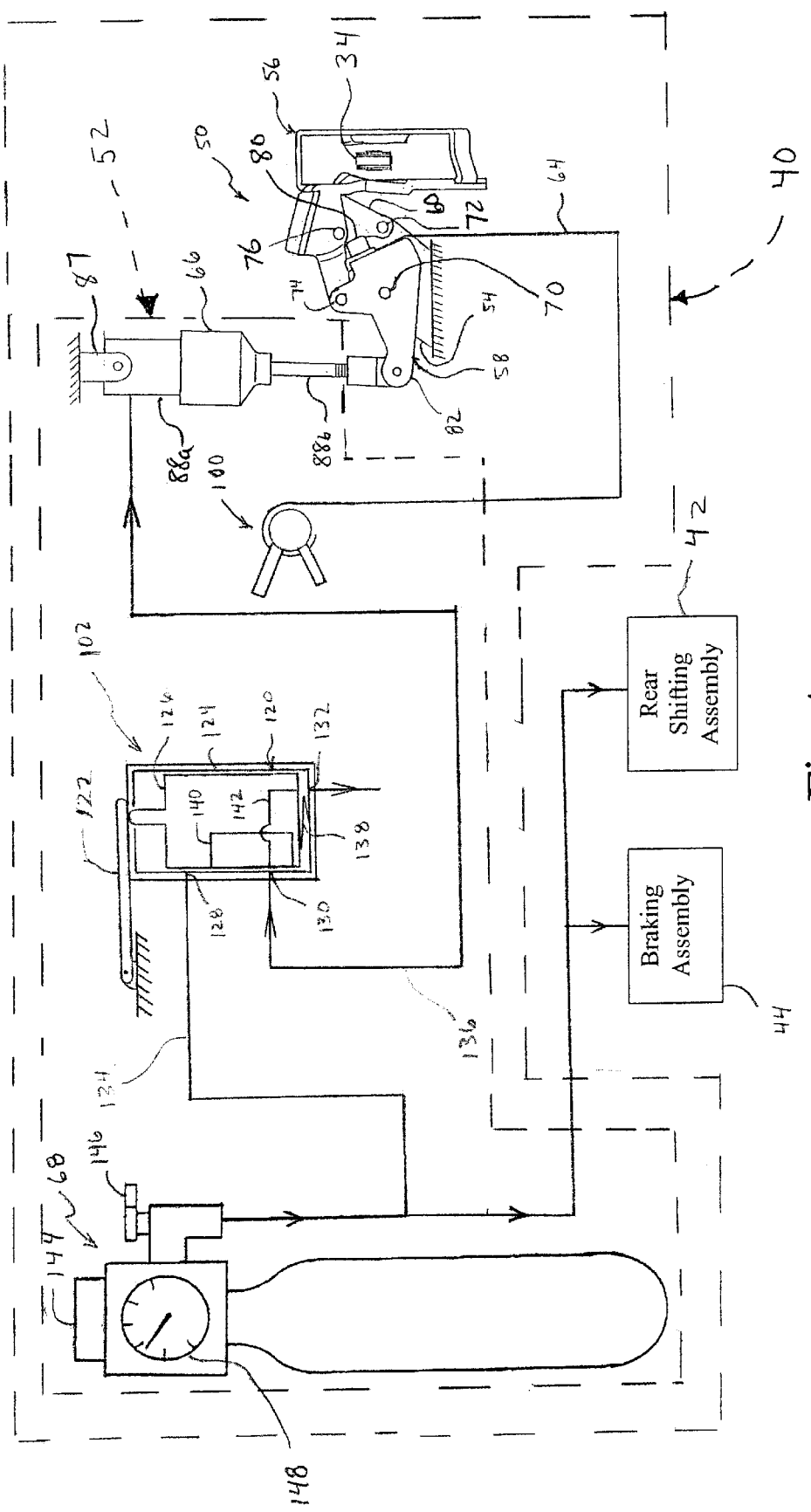
FIG. 4 is a schematic illustration of the actuating device used in conjunction with the front derailleur illustrated in FIG. 3 showing a second operating position of an operating portion in accordance with a preferred embodiment of the present invention.

As schematically illustrated in FIGS. 3 and 4, valve member 126 is located in a chamber of the housing 124 for connecting and disconnecting the inlet opening 128 to the outlet opening 130. Normally, the valve member 126 is retained by a spring 138 such that the inlet opening 128 and the outlet opening 130 are fluidly connected via a first passageway 140 formed in the valve member 126 as best seen in FIG. 3. When the actuating member 122 is pushed, this causes the valve member 126 to move axially within the chamber of housing 124 such that the inlet opening 128 is closed or sealed off by the valve member 126. Moreover, this movement of the valve member 126 causes a second passageway 142 to interconnect the outlet opening 130 to the exhaust port 132. Thus, the compressed air in the piston member 66 traveling through conduit 136 is released to the environment through exhaust port 132 as best seen in FIG. 4. Alternatively, the gas or air can be release to a recycling container (not shown), which can act as a back up supply of compressed air.

As mentioned above, actuating member 122 and valve member 126 form a switch for connecting and disconnecting the supply of pressurized fluid 68 to piston member 66. Preferably, actuating member 122 is a pivoting lever that is arranged on cable pulling member 106. When the cable pulling member 106 is pushed to perform a shifting operation, the actuating member 122 is also moved to cause the valve member 126 to release the compressed air in the piston member 66.

The supply of pressurized fluid 68 is preferably a gas filled component that is filled with compressed air or other suitable gaseous fluid. The supply of pressurized fluid 68 is fluidly coupled to front shifting component 40, rear shifting component 42 and front and rear brake component 44 through a conventional valve manifold (not shown).

The supply of pressurized fluid 68 can be a canister that is attached to bicycle frame 14 in a conventional manner as shown in FIG. 1. Alternatively, a portion of the bicycle frame 14 can also form the supply of pressurized fluid 68 if needed and/or desired. In either case, the supply of pressurized fluid 68 preferably has an air valve 144 for filling the tank with compressed air or other pressurized fluid. Preferably, the container of the supply of pressurized fluid 68 is provided with a tire-type of valve such that a manual bicycle pump or air compressor can be utilized to re-fill the compartment with more compressed air.

The container for the supply of pressurized fluid 68 is preferably filled with about five to ten kilograms/cm$^2$ of compressed air. The supply of pressure is then adjusted to about two or three kilograms/cm$^2$ with a conventional regulator 146 as seen in FIGS. 3 and 4. When the pressure reading on the pressure gauge 148 indicates a pressure below two or three kilograms/cm$^2$ in the compartment, compressed air will not be outputted from the compartment. Therefore, more compressed air must be added to the container for the supply of pressurized fluid 68.

Rear Shifting Component

Turning now to FIGS. 12–16, rear shifting component or assembly 42 in accordance with the present invention will now be discussed herein. Rear shifting component or assembly 42 includes an operated component (rear derailleur assembly) 150 and an actuating device or component (rear shifting device) 152. Rear derailleur assembly 150 is operatively coupled to actuating device 152 for shifting chain 34 between rear gears 32. Typically, bicycle 10 is provided with three to eight rear gears. The largest diameter gear will be referred to herein as the low gear, while the gear with the smallest diameter will be referred to as the top gear. The gear or gears between the top gear and the low gear will be referred to herein as the intermediate gears.

The structure and operation of rear actuating device (rear shifting device) 152 is substantially the same as the front actuating device (front shifting device) 52, thus the description thereof will be substantially omitted.

Figure 13:
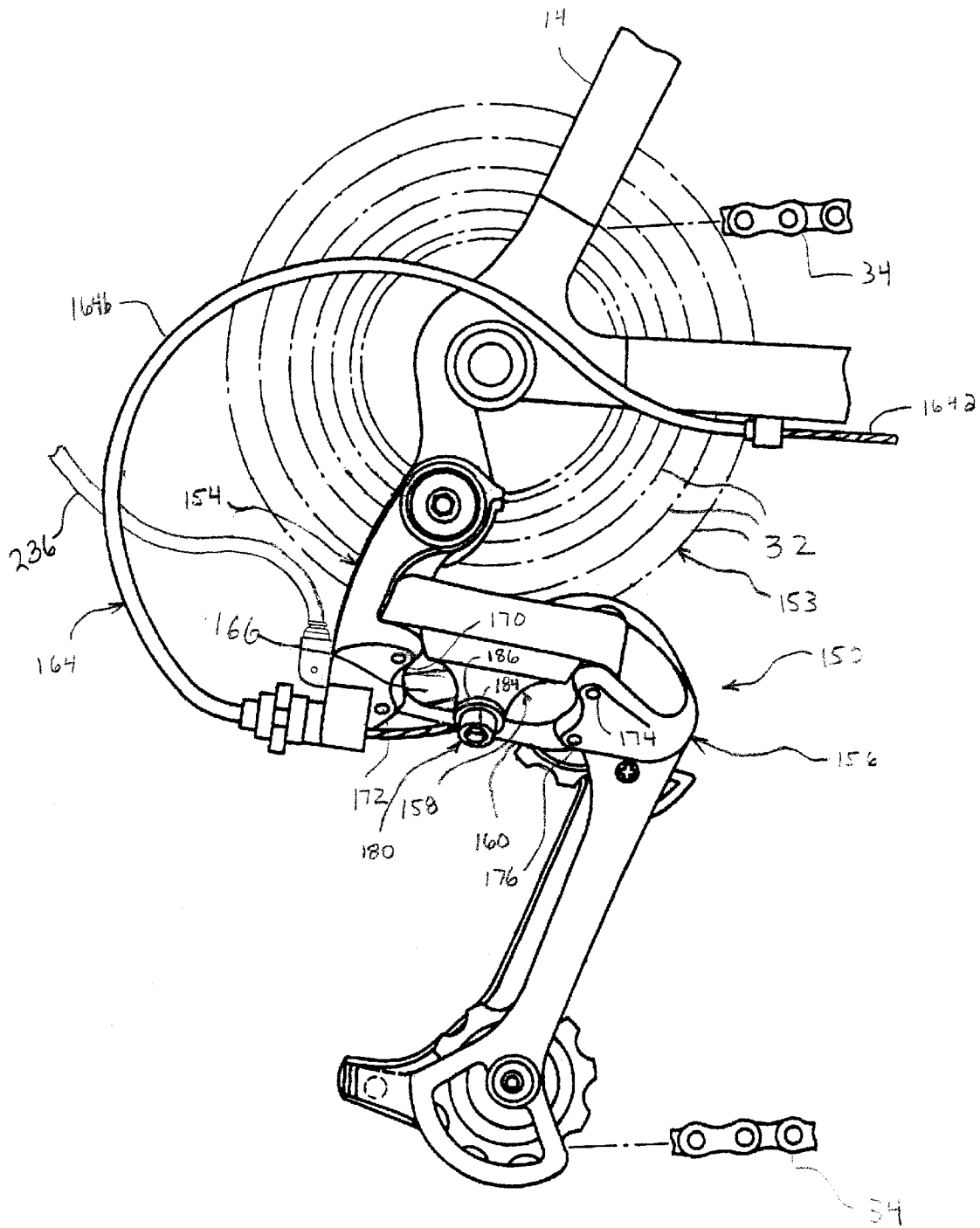
FIG. 13 is a right side elevational view of a rear derailleur mounted on a bicycle frame as illustrated in FIG. 1 in accordance with a preferred embodiment of the present invention.

Rear derailleur assembly 150 is coupled to a rear fork portion of frame 14 of a bicycle 10 (only a portion illustrated in FIG. 13). More specifically, rear derailleur assembly 150 is illustrated as being coupled to the rear fork end of frame 14 of a bicycle 10 for cooperating with a freewheel assembly 153 in a conventional manner. While the freewheel assembly 153 is illustrated with seven rear gears 32, it will become apparent to those skilled in the art from this disclosure that the freewheel assembly can have fewer or more gears as needed and/or desired. Chain 34 is operatively coupled to rear gears 32 and to front gears 30 in a conventional manner for transmitting the desired rotational torque to the rear wheel 16 of the bicycle 10.

Referring to FIG. 13, rear derailleur assembly 150 basically includes a base or fixed member 154 fixedly coupled to frame 14 and a movable member or chain guide 156 movably coupled to base member 154 via a pair of links 158 and 160. Movable member or chain guide 156 has several gear positions relative to frame 14, which correspond, to the locations of rear gears 32. In other words, in the illustrated embodiment, movable member or chain guide 156 has a first or top end position, a second or low end position and one or more intermediate positions therebetween.

Base member 154 is preferably clamped directly to the fork end of frame 14. A bracket axle assembly fixedly couples base member 154 to frame 14 of the bicycle 10 in a conventional manner. Since bracket axle assemblies are well known in the bicycle art, the structure of bracket axle assembly will not be discussed or illustrated in detail herein. While bracket axle assembly is illustrated as being coupled directly to frame 14, it will be apparent to those skilled in the art from this disclosure that a removable derailleur hanger or hanging plate (not shown) can be utilized to connect bracket axle assembly of base member 154 to frame 14. These types of derailleur hangers (not shown) are well known in the art, and thus, will not be discussed or illustrated hereon.

Base member 154 includes a pair of pivot pins 170 and 172 for pivotally coupling first ends of links 158 and 160 thereto. The other ends of links 158 and 160 are coupled to chain guide 156 via pivot pins 174 and 176. Links 158 and 160 together with base member 154 and chain guide 156 form a four-bar linkage assembly. In particular, base member 154 forms a first link between pivot pins 170 and 172, movable member 156 forms a second link between pivot pins 174 and 176, while links 158 and 160 form the third and fourth links.

Link 158 has a cable attachment member 180 coupled thereto for attaching control cable 164 thereto. Cable attachment member 180 is preferably formed as a conventional bolt 184 and a wire clamp 186 for attaching an inner wire 164a of cable 164 thereto. Link 158 also has a piston connecting portion with piston member 166 coupled thereto.

Preferably, cable 164 is a conventional cable having an inner wire 164a and a sheath or housing portion 164b such that inner wire 164a can slide easily within sheath portion 164b. Therefore, cable 164 will not be discussed or illustrated in detail herein.

Control cable 164 and piston member 166 of actuating device 152 controls the movements of chain guide 156 and links 158 and 160. Specifically, piston member 166 acts as a biasing member to take up slack in control cable 164 to move movable member 156 from the top end position (smallest gear) to the low end position (largest gear). Control cable 164 compresses piston member 166 to move movable member 156 from the toy end position to the low end position once the pressure in piston member 166 has been released. Piston member (biasing member) 166 normally biases movable member 156 in a transverse direction towards the frame of bicycle 10. In other words, piston member (biasing member) 166 normally biases chain guide 156 toward frame 14 of bicycle 10, such that movable member 156 holds chain 34 over the smallest gear 32 that is closest to frame 14.

Figure 12:
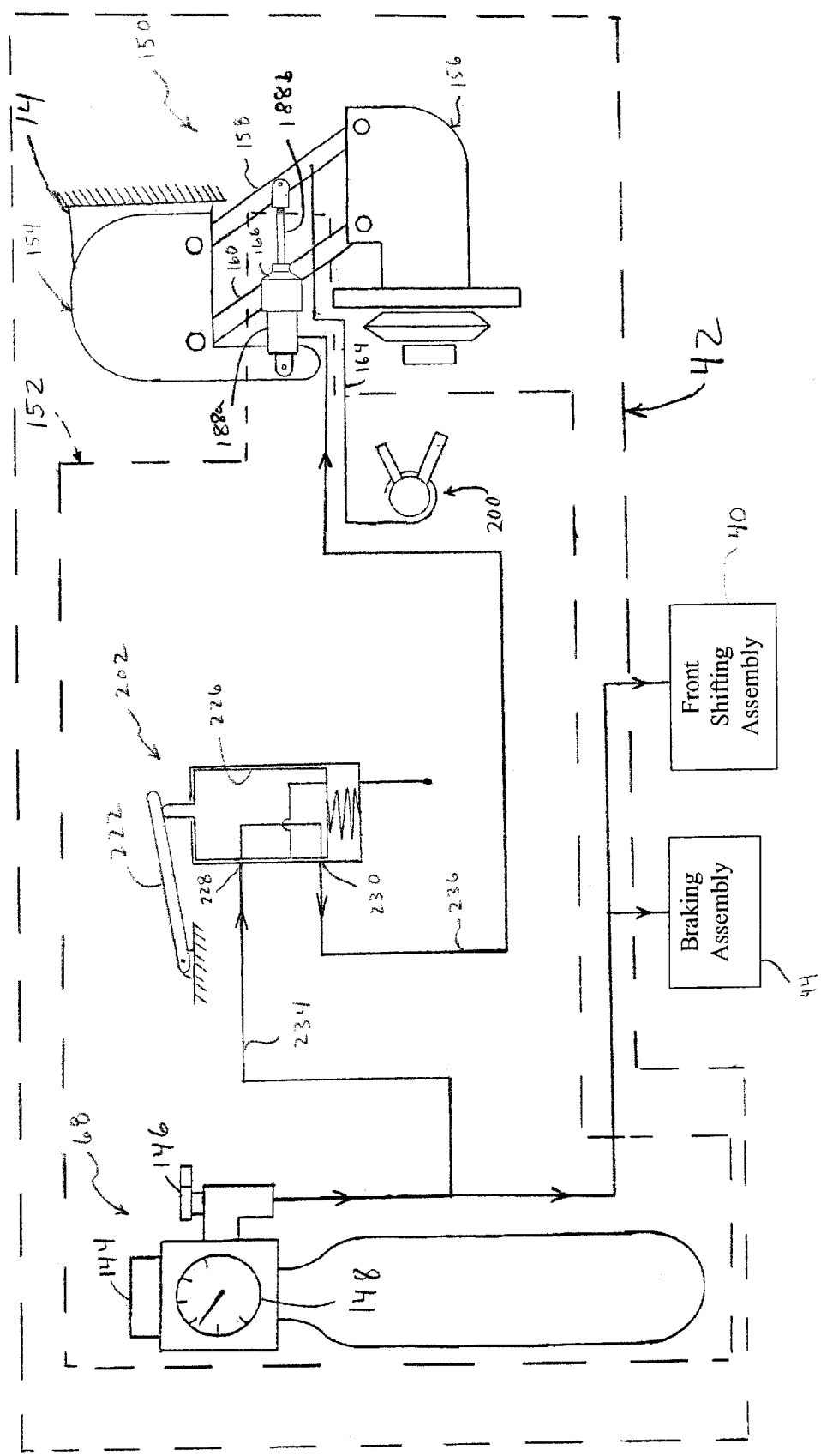
FIG. 12 is a schematic illustration of an actuating device used in conjunction with a rear derailleur assembly in accordance with a preferred embodiment of the present invention.

As schematically illustrated in FIG. 12, piston member 166 is fixedly coupled at one end to base member 154 and coupled to link 158 at the other end. Piston member 166 is preferably a conventional piston, which has a cylinder housing 188a forming a chamber with a piston rod 188b movably arranged therein. In particular, the chamber of cylinder housing 188a is fluidly coupled to the supply of pressurized fluid 68. When the chamber of cylinder housing 188a is pressurized, piston rod 188b is forced outwardly from cylinder housing 188a. These outward movements of piston rod 188b causes link 158 to rotate, which in turn moves chain guide 156. When the chamber of cylinder housing 188a is depressurized, piston rod 188b is forced inwardly into cylinder housing 188a by the control cable 164 that rotates link 158. Since the chamber of cylinder housing 188a is depressurized, piston rod 88b is easily retracted to shift chain guide 156. Since piston members such as piston member 166 are well known in the prior art, piston member 166 will not be discussed or illustrated in detail herein.

Figure 14:
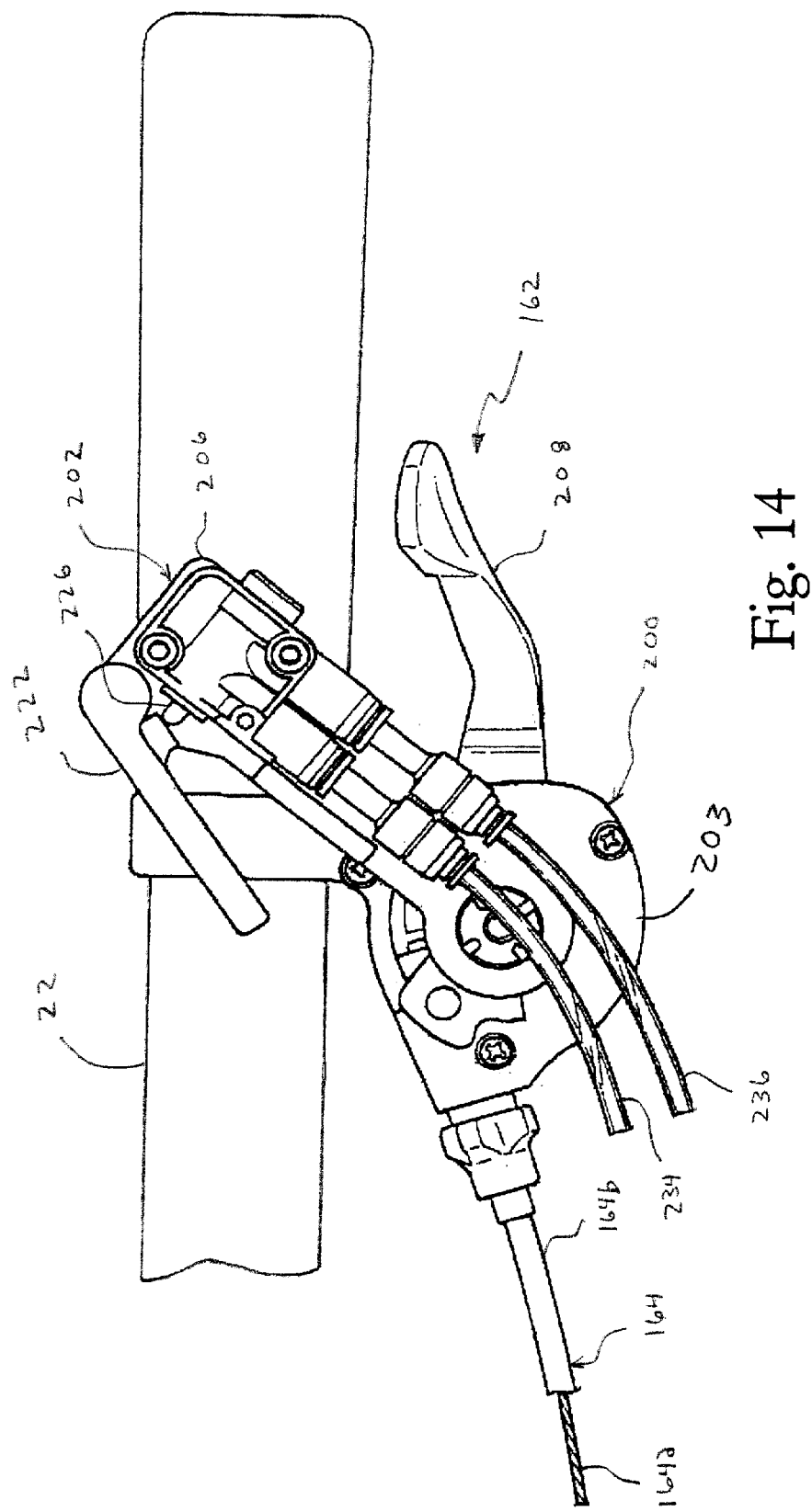
FIG. 14 is an enlarged bottom plan view of a rear derailleur actuating device mounted on a handlebar of a bicycle showing a first actuating position in accordance with a preferred embodiment of the present invention.
Figure 15:
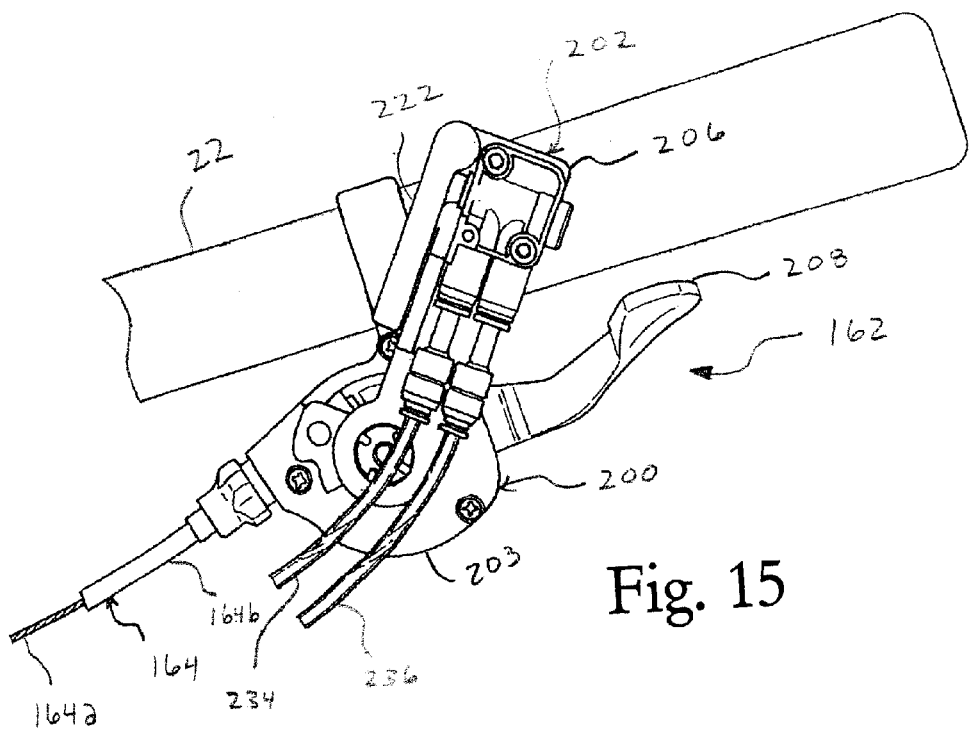
FIG. 15 is a bottom plan view of the rear derailleur actuating device illustrated in FIG. 14 showing a second actuating position in accordance with a preferred embodiment of the present invention.
Figure 16:
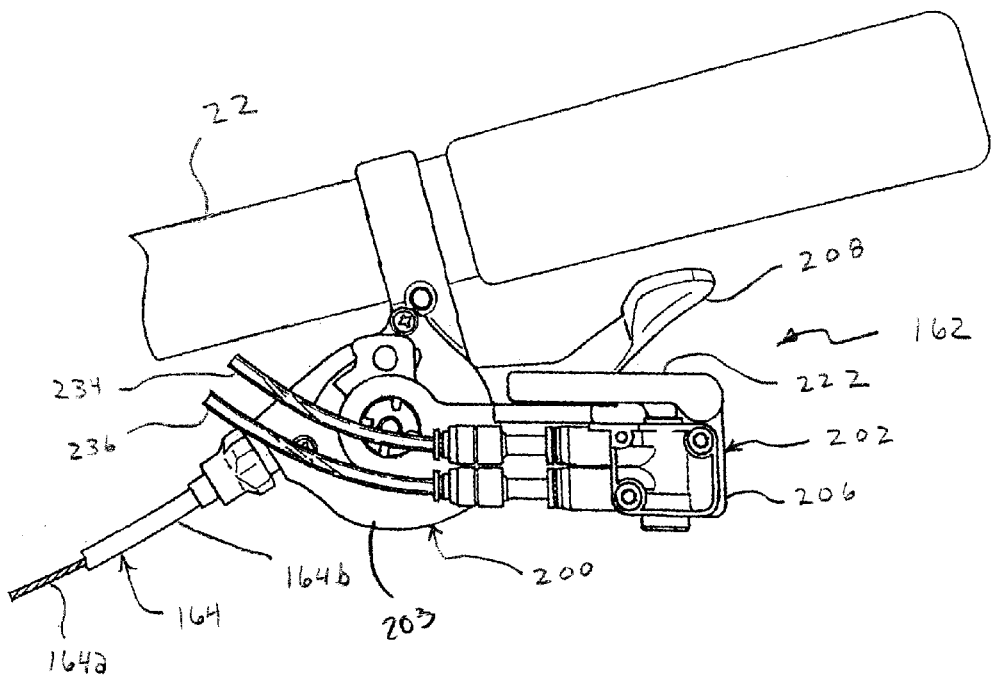
FIG. 16 is a bottom plan view of the rear derailleur actuating device illustrated in FIGS. 14 and 15 showing a third actuating position in accordance with a preferred embodiment of the present invention.

Referring to FIGS. 14–16, operating portion or mechanism 162 of actuating device 152 is a shifting unit or assembly, which basically includes a cable control mechanism 200 and a fluid control mechanism 202. Cable control mechanism 200 is designed for pulling and releasing inner wire 164a of control cable 164, which is coupled to rear derailleur assembly 150. Fluid control mechanism 202 is designed to pressurize and depressurize piston member 166, which acts as a biasing member to apply a biasing force on rear derailleur assembly 150 to take up any slack created in control cable 164 by cable control mechanism 200. Thus, cable control mechanism 200 and fluid control mechanism 202 cooperate together to move chain guide 156 via control cable 164 and piston member 166. The supply of pressurized fluid 68 is operatively coupled to piston member 166 and thus, the supply of pressurized fluid 68 is also a part of the rear actuating device 152.

Cable control mechanism 200 has the same basic construction as cable control mechanism 100, discussed above. Specifically, cable control mechanism 200 has a cable pulling lever 206 and a cable releasing lever 208 that are operatively coupled to an indexing mechanism in a housing 203 for pulling and releasing control cable 164. Housing 203 mounts the shifting device to handlebar 22 in a conventional manner.

For example, when the cable pulling lever 206 is shifted in a first direction from an original position as shown in FIG. 15 to a second position as shown in FIG. 16, the inner wire 164a of control cable 164 is winded. Cable pulling lever 206 may be released after being operated a predetermined amount necessary for effecting a change of speed. Then, cable pulling lever 206 automatically returns to the original position under the biasing force of return spring (not shown). At this time, despite the return to the original position of the cable pulling lever 206, the inner wire 164a of control cable 164 remains in the winded position by a ratchet-type interlocking portion to complete the change of speed.

The cable release lever 208 is shifted in the opposite direction relative to cable pulling lever 206 from an original position. Thereafter, the cable release lever 208 may be released to return to the original position by the biasing force of a return spring (not shown). This movement of cable release lever 208 causes the inner wire of control cable 164 to be released. The inner wire 164*a* of control cable 164 is then pulled by piston member 166 to take-up the slack in inner wire 164*a*, which in turn moves movable member 156. Consequently, the shifting device unwinds the inner wire of control cable 164 to effect a one-stage change of speed.

Referring to FIGS. 12 and 14–16, fluid control mechanism 202 is preferably mounted on cable pulling lever 206 for movement therewith. Fluid control mechanism 202 has the same construction as fluid control mechanism 102. Thus, fluid control mechanism 202 will not be discussed or illustrated herein. Fluid control mechanism 202 has an inlet opening or port 228 fluidly connected via a conduit or tube 234 to the pressurized fluid 68, and an outlet opening or port 230 fluidly connected by a tube or conduit 236 to piston member 166.

Fluid control mechanism 202 has an actuating member 222 and a valve member 226 that acts as a switch that connects and disconnects the supply of pressurized fluid 68 to piston member 166 in a manner substantially the same as fluid control mechanism 102. Preferably, actuating member 222 is a pivoting lever that is arranged on cable pulling member 206 so that when the cable pulling member 206 is pushed to perform a shifting operation, the actuating member 222 is also moved to cause the valve member 226 to release the compressed air in the piston member 166.

Rear derailleur assembly 150 is operatively coupled to rear shifting device 152 via a control cable 164 and an air tube or conduit 236 in a substantially the same manner in which front derailleur assembly 50 is operatively coupled to front shifting device 52. Control cable 164 and conduit 136 provide a shifting force to rear derailleur 150 for moving chain 34 between gears 32. When the rider moves or shifts the cable pulling member 206 of rear shifting device 152, actuating member 222 is also moved to release the compressed air in the piston member 166 and inner wire 164*a* of cable 164 pulls movable member 156 to move chain 34 inwardly to engage the next gear. When the rider moves or shifts the cable releasing member 208 of shift rear shifting device 152, slack is created in control cable 164 and piston member 166 moves movable member 156 and chain 34 outwardly to engage the next gear and effectively take-up the slack in cable 164. In other words, chain 34 is either moved inwardly towards the longitudinal center plane of bicycle 10 to engage the next larger gear or sprocket, or moved outwardly away from the longitudinal center plane of bicycle 10 to engage the next smaller gear or sprocket. Rear derailleur assembly 150 is designed to be normally biased outwardly by piston member 166 such that chain 34 is normally positioned on the outermost or smallest gear 32.

Brake Component Assemblies

Figure 17:
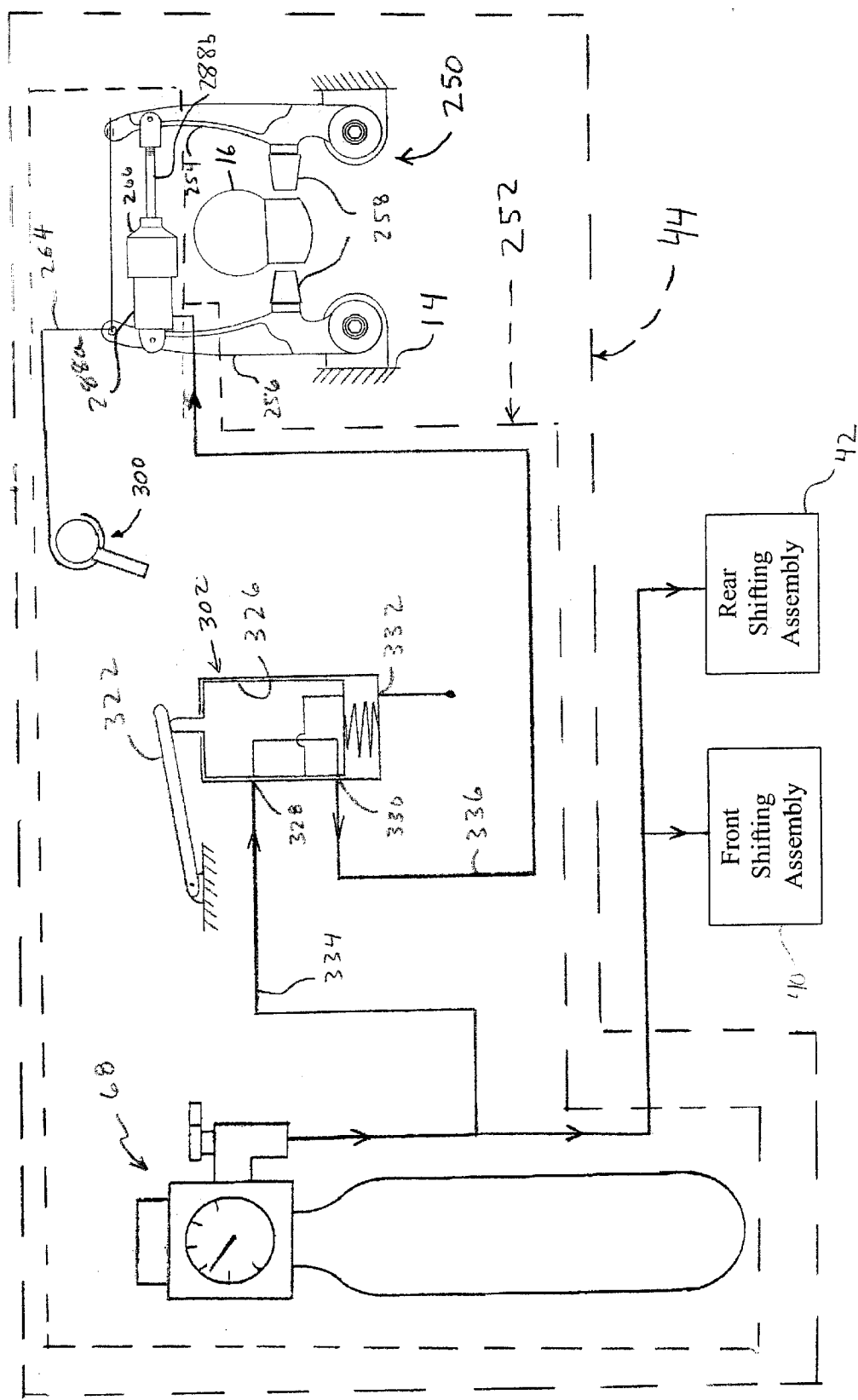
FIG. 17 is a schematic illustration of an actuating device used in conjunction with a brake component in accordance with a preferred embodiment of the present invention.
Figure 18:
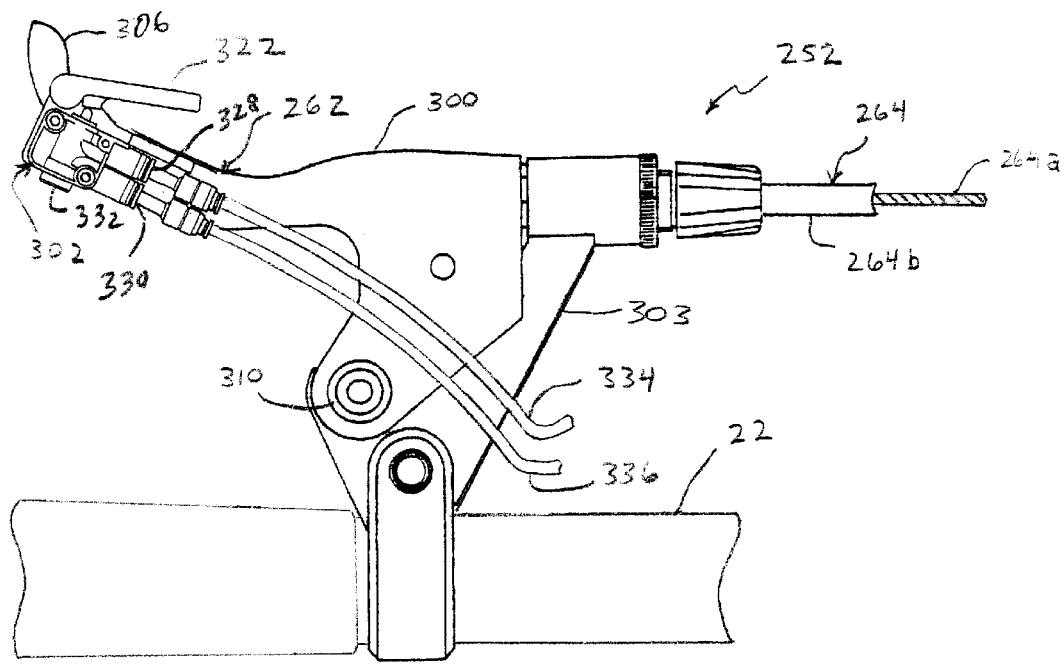
FIG. 18 is a bottom plan view of a brake actuating device mounted to a handlebar of a bicycle in accordance with a preferred embodiment of the present invention.
Figure 19:
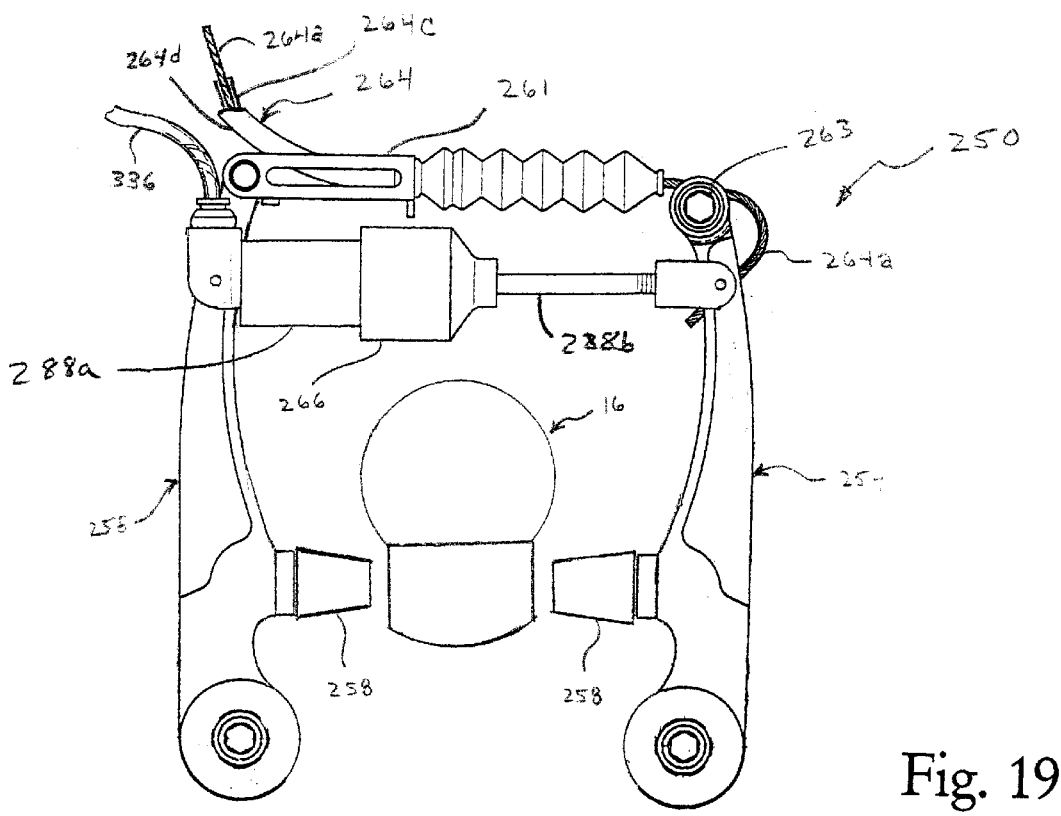
FIG. 19 is an elevational view of a brake component assembly in accordance with a preferred embodiment of the present invention.

Turning now to FIGS. 17–19, bicycle brake component 44 in accordance with the present invention will now be discussed herein. Bicycle brake component 44 basically include an operated component (brake device or assembly) 250 and an actuating device or component (brake operating device) 252. Each brake device 250 is operatively coupled to one of the actuating devices 252 for stopping or slowing the rotation of wheels 16. Bicycle brake component 44 are cantilever type brake devices that are mounted on the front and rear forks of bicycle frame 14 in a conventional manner. Of course, the present invention can be used with most types of cable operated brake devices.

Preferably, the front and rear braking devices 250 are substantially the same. Therefore, the rear braking device will not be described or illustrated in detail herein. Brake device 250 has a pair of brake arms 254 and 256 that are pivotally supported on a front fork of a bicycle frame as seen in FIG. 1.

Brake device 250 achieves a braking effect by brake cable 264 pulling the upper ends of brake arms 254 and 256 together, which in turn presses brake shoes 258 against side surfaces of the rim of bicycle wheel 16. Piston member 266 is operatively coupled between brake arms 254 and 256 for biasing brake arms 254 and 256 away from each other. In other words, the movements of brake arms 254 and 256 are controlled by control cable 264 (brake cable) and piston member 266 which are controlled by actuating device (brake operating device) 252. Specifically, piston member 266 acts as a biasing member to take up slack in brake cable 264 to move brake arms 254 and 256 away from each other to a non-braking position such that brake shoes 258 are spaced from the rim of the bicycle wheel 16. Cable 264 compresses piston member 266 to move brake arms 254 and 256 together to a braking position such that brake shoes 258 engage the rim to decrease the speed of the bicycle 10.

Brake cables, such as the brake cable 264 used with the brake device 250, are currently available on the market and basically comprises an inner wire 264*a* and an outer casing 264*b*. The outer casing 264*b* preferably has an inner layer made of metal and an outer layer made of resin. The inner wire 264*a* is preferably made of thin steel wires. The inner wire guiding tube 264*d* is preferably made of metal, such as aluminum, and has a plastic liner 264*c* as seen in FIG. 19.

Piston member 266 is preferably a conventional piston, which has a cylinder housing 288*a* forming a chamber with a piston rod 288*b* movably arranged therein. In particular, the chamber of cylinder housing 288*a* is fluidly coupled to the supply of pressurized fluid 68. Thus, the supply of pressurized fluid 68 is also a part of the brake actuating device (brake operating device) 252. When the chamber of cylinder housing 288*a* is pressurized, piston rod 288*b* is forced outwardly from cylinder housing 288*a* to cause brake arms 254 and 256 to be biased apart. When the chamber of cylinder housing 288*a* is depressurized, piston rod 288*b* is forced inwardly into cylinder housing 288*a* by the control cable 264 to cause brake arms 254 and 256 to be pulled towards each other to perform a braking action. Since piston members such as piston member 266 are well known in the prior art, piston member 266 will not be discussed or illustrated in detail herein.

Figure 2:
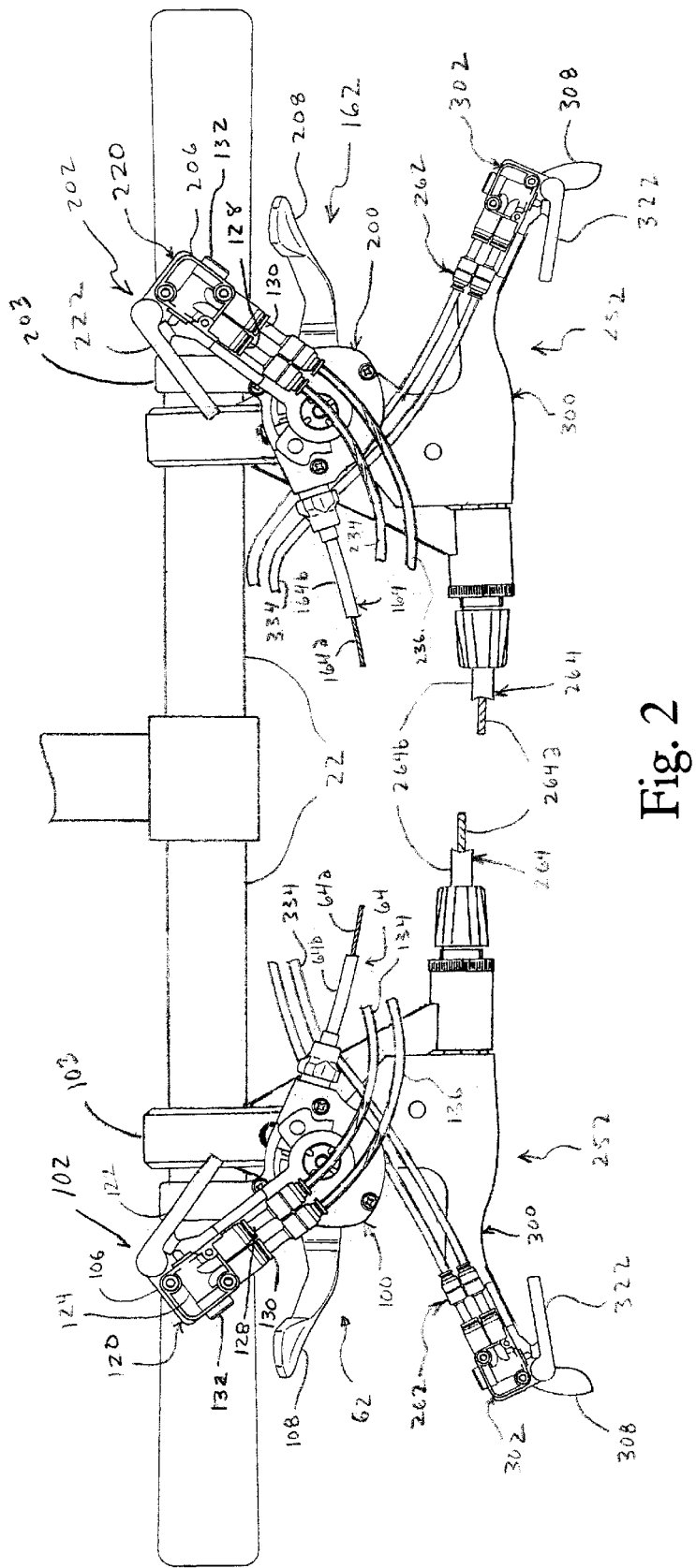
FIG. 2 is a bottom plan view of brake and derailleur actuating devices mounted on a handlebar of a bicycle in accordance with a preferred embodiment of the present invention.

The brake arm 254 of the brake device 250 is connected at an upper end thereof with a first end of an inner wire 264*a* of a brake cable 264 through a screw 263. The second end of the inner wire 264*a* is connected to a brake lever provided on a handlebar as seen in FIGS. 2 and 18 in a conventional manner. The brake arm 256 of the brake device 250 is provided at an upper end thereof with a connecting arm 261, which is pivotable about the upper end of the brake arm 256.

The second end (not shown) of the inner wire 264*a* is fixed to an inner wire end mounting portion of the brake lever (not shown). The first end of the inner wire 264*a* is then fixed to the upper end of the brake arm 254 through the screw 263. When a rider grips the brake lever to pull the inner wire 264*a* of the brake cable 264 for braking operation, a tension (retraction force) is produced on the inner wire 264*a*.

Referring to FIGS. 18 and 19, operating portion or mechanism 262 of actuating device 252 is a braking lever or assembly, which basically includes a cable control mechanism 300 and a fluid control mechanism 302 (e.g., brake lever with pneumatic components). Cable control mechanism 300 is designed for pulling and releasing inner wire 264a of cable 264, which is coupled to brake arms 254 and 256. Fluid control mechanism 302 is designed to pressurize and depressurize piston member 266, which acts as a biasing member to apply a biasing force between brake arms 254 and 256 to take up any slack created in inner wire 264a of control cable 264 by cable control mechanism 300. Thus, cable control mechanism 300 and fluid control mechanism 302 cooperate together to move brake arms 254 and 256 via control cable 264 and piston member 266.

Cable control mechanism 300 has a brake lever 306 that is pivotally mounted to a bracket 303 by pivot pin 310. Brake lever 306 is coupled to inner wire 264a of cable 264 for pulling and releasing inner wire 264a of cable 264.

Referring to FIG. 17, fluid control mechanism 302 is preferably mounted on brake lever 306 for movement therewith. Fluid control mechanism 302 has the same construction as fluid control mechanism 102. Thus, fluid control mechanism 302 will not be discussed or illustrated herein. Fluid control mechanism 302 has an inlet opening or port 328 fluidly connected via a conduit or tube 334 to the pressurized fluid 68, and an outlet opening or port 330 fluidly connected by a tube or conduit 336 to piston member 266.

Fluid control mechanism 302 has an actuating member 322 and a valve member 326 that acts as a switch that connects and disconnects the supply of pressurized fluid 68 to piston member 266. Preferably, actuating member 322 is a pivoting lever that is arranged on brake lever 306. When brake lever 306 is pulled to pivot about pivot pin 310 to perform a braking operation, the actuating member 322 is also moved to cause the valve member 326 to release the compressed air in the piston member 266.

Brake device 250 is operatively coupled to actuating device (brake operating device) 252 via a control cable 264 (brake cable) and an air tube or conduit 336 to provide a braking force and a releasing force for moving brake arms 254 and 256. When the rider moves brake lever 306, actuating member 322 is also moved to release the compressed air in the piston member 266 and simultaneously pull inner wire 264a of cable 264. This pulling of inner wire 264a moves brake arms 254 and 256 together to engage brake shoes 258 with the rim of the wheel 16. When the rider releases brake lever 306 and actuating member 322, slack is created in inner wire 264a of cable 264 and piston 266 is pressurized. Thus, piston member 266 moves brake arms 254 and 256 apart to allow free rotation of wheel 16.

Internal Shifting Hub

Figure 20:
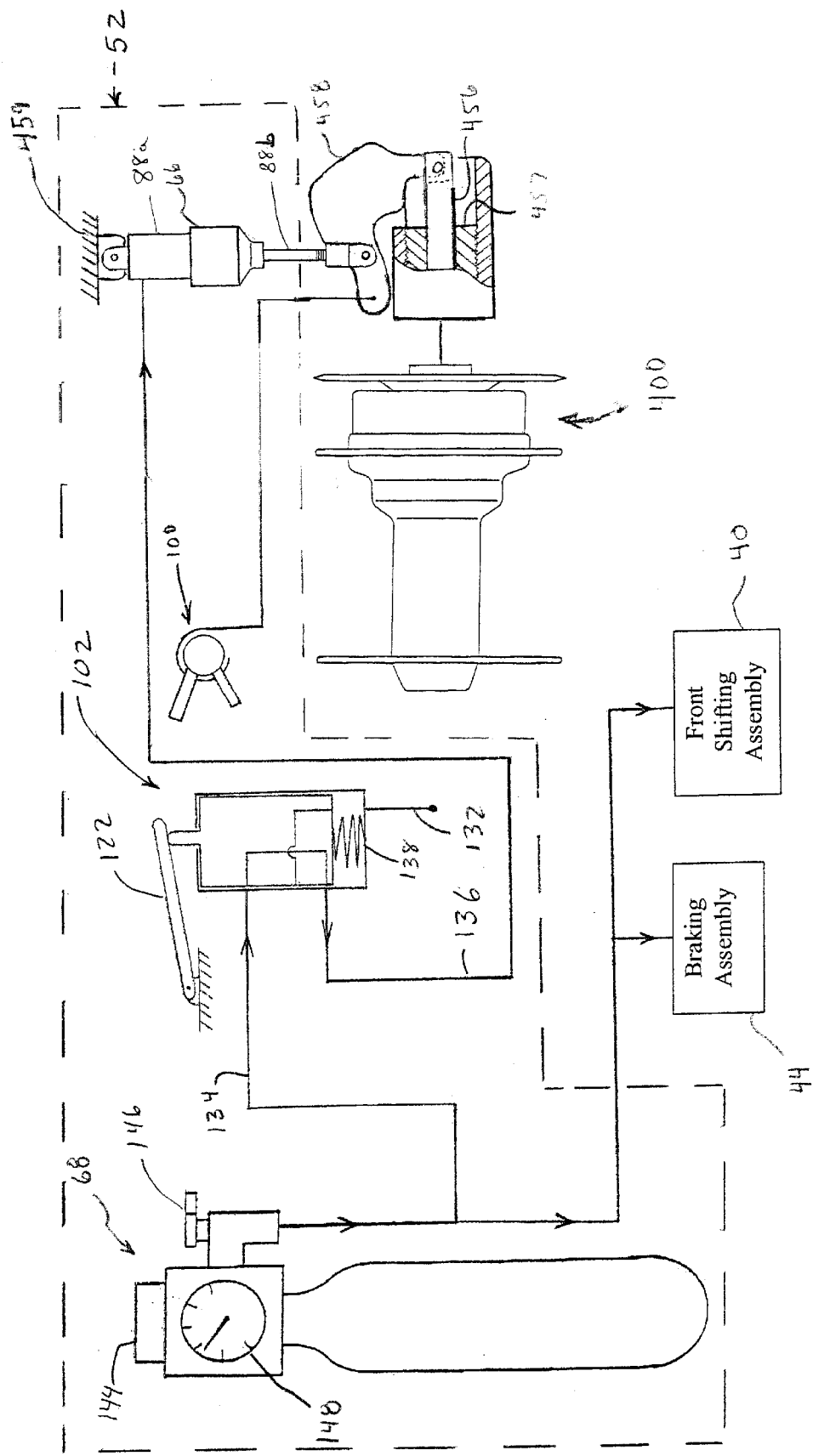
FIG. 20 is a schematic illustration of an actuating device used in conjunction with an internal shifting hub component in accordance with a second embodiment of the present invention.
Figure 21:
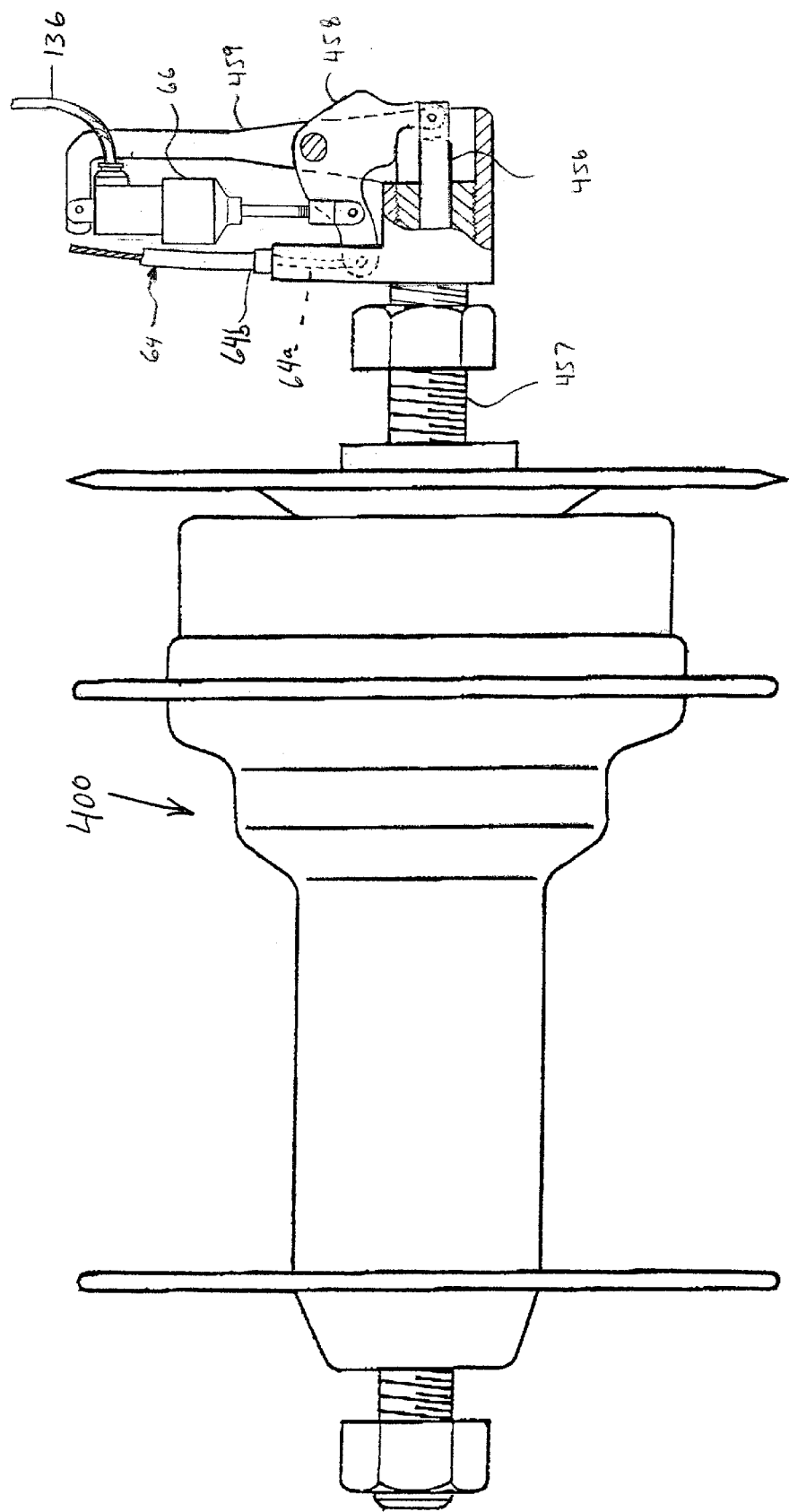
FIG. 21 is a rear elevational view of an internal shifting hub component in accordance with a second embodiment of the present invention.

Referring now to FIGS. 20 and 21, a multi-speed internal shifting hub 400 is illustrated in accordance with the present invention. In the illustrated embodiment, actuating device 52 of the first embodiment is operatively connected to multi-speed internal shifting hub 400, which mounts the rear wheel 16 to frame 14. More specifically, in this embodiment, operating portion or mechanism 62 of shifting device 52 of the first embodiment is operatively coupled to internal shifting hub 400 for shifting internal shifting hub 400. Moreover, the supply of pressurized fluid 68 with piston 66 is operatively coupled to internal shifting hub 400. In other words, operating portion or mechanism 62 utilizes control cable 64 and piston member 66 to up and down shift internal shifting hub 400.

Internal shifting hubs, such as internal shifting hub 400, are known in the art. Thus, internal shifting hub 400 will not be discussed or illustrated in detail herein. One example of an internal shifting hub and a shifting assembly, which technology can be used in the present invention, is disclosed in U.S. Pat. No. 5,928,103, assigned to Shimano Inc. Basically, the present invention eliminates the return spring on the push rod of the internal hub of the prior patent by using piston member 66.

Internal shifting hub 400 has a movable member or push rod 456 axially movable within axle 457, and a link member 458 pivotally mounted on axle 457 by a support bracket 459. The outer casing of shift control cable 64 is stopped at this support bracket 459, and the inner wire of control cable 64 is connected to a first end of the link member 458. The second end of the link member 458 is pivotally coupled to the outer end of a push rod 456. Pulling the inner wire of control cable 64 by means of the operating portion or mechanism 62 causes the link member 458 to rotate and press against the push rod 456. This inward movement of the push rod 456 causes the internal hub 400 to upshift. When the inner wire of cable 64 is slackened, the push rod 456 is pulled outwardly from the axle 457 under the biasing force of piston 66 such that the internal hub 400 can down shift in a conventional manner.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A vehicle component assembly comprising:
   an operated component having a movable portion that moves between at least a first position and a second position; and
   an actuating device operatively coupled to said operated component to move said movable portion between said first position and said second position, said actuating device including
      an operating portion having a supply of pressurized fluid with a control valve and a control mechanism,
      a mechanical coupling portion operatively coupled between said control mechanism of said operating portion and said movable portion of said operated component to control movement of said movable portion between said first position and said second position in response to movement of said mechanical coupling portion, and
      a piston portion operatively coupled to said supply of pressurized fluid of said operating portion and said movable portion of said operated component to fluidly bias said movable portion from said first position to said second position, said mechanical coupling portion and said piston portion being coupled in parallel between said operating portion and said movable portion.

2. A vehicle component assembly according to claim 1, wherein
   said mechanical coupling portion includes a flexible cable having a first end coupled to said movable portion and a second end coupled to said operating portion of said actuating device.

3. A vehicle component assembly according to claim 2, wherein said control mechanism includes an indexing mechanism that is coupled to said second end of said cable.

4. A vehicle component assembly according to claim 3, wherein said indexing mechanism includes at least three positions to maintain said movable portion in said first and second positions and at least one intermediate position located between said first and second positions.

5. A vehicle component assembly according to claim 2, wherein said control mechanism further includes a cable release member and a cable pulling member.

6. A vehicle component assembly comprising:

an operated component having a movable portion that moves between at least a first position and a second position; and an actuating device operatively coupled to said operated component to move said movable portion between said first position and said, second position, said actuating device including an operating portion having a supply of pressurized fluid with a control valve and a control mechanism, said control mechanism including a cable release member and a cable pulling member, said cable release member and said cable pulling member being levers, a mechanical coupling portion operatively coupled between said control mechanism of said operating portion and said movable portion of said operated component to control movement of said movable portion between said first position and said second position in response to movement of said mechanical coupling portion, said mechanical coupling portion including a flexible cable having a first end coupled to said movable portion and a second end coupled to said operating portion of said actuating device, and a piston portion operatively coupled to said supply of pressurized fluid of said operating portion and said movable portion of said operated component to fluidly bias said movable portion from said first position to said second position.

7. A vehicle component assembly comprising:

an operated component having a movable portion that moves between at least a first position and a second position; and an actuating device operatively coupled to said operated component to move said movable portion between said first position and said second position, said actuating device including an operating portion having a supply of pressurized fluid with a control valve and a control mechanism, said control mechanism including a cable release member and a cable pulling member, said control valve including a switch located on said cable pulling member, a mechanical coupling portion operatively coupled between said control mechanism of said operating portion and said movable portion of said operated component to control movement of said movable portion between said first position and said second position in response to movement of said mechanical coupling portion, said mechanical coupling portion including a flexible cable having a first end coupled to said movable portion and a second end coupled to said operating portion of said actuating device, and a piston portion operatively coupled to said supply of pressurized fluid of said operating portion and said movable portion of said operated component to fluidly bias said movable portion from said first position to said second position.

8. A vehicle component assembly according to claim 7, wherein said switch includes an actuating member that is movable between an open position and a closed position, said actuating member being arranged on said cable pulling lever such that said actuating member can be operated during movement of said pulling member.

9. A vehicle component assembly according to claim 1, wherein said actuating device includes a mounting portion adapted to be coupled to part of a vehicle.

10. A vehicle component assembly according to claim 1, wherein said movable portion is part of a front derailleur having a base member with a bicycle attachment portion.

11. A vehicle component assembly according to claim 1, wherein said movable portion is part of a rear derailleur having a base member with a bicycle attachment portion.

12. A vehicle component assembly according to claim 1, wherein said movable portion is part of an internally geared hub for a bicycle wheel.

13. A vehicle component assembly according to claim 1, wherein said movable portion is part of a brake device having a base member with a bicycle attachment portion.

14. A method of operating a vehicle component assembly, comprising the steps of:

providing an operated component having a movable portion that moves between a first position and a second position;

providing an actuating device operatively coupled to said operated component to move said movable portion between said first and second positions;

supplying pressurized fluid from a supply of pressurized fluid to a piston that is operatively coupled to said movable portion of said operated component such that pressure in said piston normally applies a biasing force on said movable portion to move said movable portion from said first position to said second position by said biasing force when a mechanical coupling portion operatively coupled to said movable portion is moved in a first direction; and releasing pressure in said piston and moving said mechanical coupling portion in a second direction to move said movable portion from said second position to said first position.

15. A method according to claim 14, wherein said step of moving said mechanical coupling portion includes providing a flexible cable having a first end coupled to said movable portion of said operated component and a second end coupled to said actuating device.

16. A method according to claim 14, wherein said step of moving said mechanical coupling portion includes moving said mechanical coupling portion to move said movable portion to at least one intermediate position located between said first and second positions; and said step of supplying pressurized fluid to said piston includes moving said movable member to said intermediate position.

17. A method according to claim 14, wherein
said actuating device includes an indexing mechanism with a cable release member and a cable pulling member operatively coupled to said operated component by said cable, said cable pulling member having a switch that is movable between an open position and a closed position, said switch being arranged on said cable pulling member such that said switch can be operated during movement of said cable pulling member.

18. A method according to claim 14, wherein
said movable portion is part of a front derailleur having a base member with a bicycle attachment portion.

19. A method according to claim 14, wherein
said movable portion is part of a rear derailleur having a base member with a bicycle attachment portion.

20. A method according to claim 14, wherein
said movable portion is part of an internally geared hub for a bicycle wheel.

21. A method according to claim 14, wherein
said movable portion is part of a brake device having a base member with a bicycle attachment portion.

22. An actuating device for a vehicle comprising:
an operating mechanism arranged to move a control element in a first direction and to release said control element to allow movement of said control element in a second direction via fluid pressure;
an indexing mechanism operatively coupled to said operating mechanism and having at least two positions to selectively maintain said control element in said two positions in response to movement of said operating mechanism;
a valve mechanism operatively coupled to said operating mechanism to open and close a fluid passageway in response to movement of said operating mechanism to selectively apply an operating force in said second direction on said control element via said fluid pressure; and
a manually operated member with an attachment portion arranged to operate said indexing mechanism in parallel with said valve mechanism.

23. An actuating device according to claim 22, wherein
said indexing mechanism includes at least three positions for holding said control element member in said first and second positions and at least one intermediate position located between said first and second positions.

24. An actuating device according to claim 22, wherein
said indexing mechanism includes a cable winding member as said manually operated member and said cable winding member includes a cable attachment portion.

25. An actuating device according to claim 24, wherein
said operating mechanism includes a cable release member and a cable pulling member coupled to said cable winding member.

26. An actuating device for a vehicle comprising:
an operating mechanism arranged to move a control element;
an indexing mechanism operatively coupled to said operating mechanism and having at least two positions to selectively maintain said control element in said two positions in response to said operating member, said indexing mechanism including a cable winding member with a cable attachment portion; and
a valve mechanism operatively coupled to said operating mechanism to open and close a fluid passageway in response to said operating mechanism,
said operating mechanism including a cable release member and a cable pulling member coupled to said cable winding member, said cable release member and said cable pulling member being levers.

27. An actuating device according to claim 26, wherein
said valve mechanism includes a switch located on said cable pulling member.

28. An actuating device according to claim 27, wherein
said switch includes an actuating member that is movable between an open position and a closed position, said actuating member being arranged on said cable pulling member such that said actuating member can be operated during movement of said pulling member.

29. An actuating device according to claim 28, wherein
said valve mechanism includes housing portion with an inlet opening and an outlet opening being selectively connected by a valve member movably located in said housing to selectively couple said inlet opening to said outlet opening closing when said valve member is in a first position and said outlet opening to an exhaust port when said valve member is in a second position.

30. An actuating device according to claim 22, wherein
said valve mechanism includes housing portion with an inlet opening and an outlet opening being selectively connected by a valve member movably located in said housing to selectively couple said inlet opening to said outlet opening closing when said valve member is in a first position and said outlet opening to an exhaust port when said valve member is in a second position.

31. An actuating device according to claim 29, further comprising
a supply of pressurized fluid coupled to said inlet opening of said housing, and a piston member coupled to said outlet opening of said housing.

32. An operated component for a vehicle comprising:
a base member;
a movable member movably coupled to said base member between at least a first position and a second position, said movable member having a mechanical coupling connection adapted to be coupled to a mechanical coupling assembly to move said movable member from said second position to said first position; and
a piston member coupled to said movable member in parallel with the mechanical coupling assembly and adapted to be fluidly coupled to a supply of pressurized fluid to move said movable member from said first position to said second position.

33. An operated component according to claim 32, wherein
said movable member is part of a front derailleur and said base member includes a bicycle attachment portion.

34. An operated component according to claim 32, wherein
said movable member is part of a rear derailleur and said base member includes a bicycle attachment portion.

35. An operated component according to claim 32, wherein
said movable member is part of an internally geared hub for a bicycle wheel.

36. An operated component according to claim 32, wherein
said movable member is part of a brake device and said base member includes a bicycle attachment portion.

37. An actuating device for a vehicle comprising:
an operating mechanism arranged to move a control element;
an indexing mechanism operatively coupled to said operating mechanism and having at least two positions to selectively maintain said control element in said two positions in response to said operating member, said indexing mechanism including a cable winding member with a cable attachment portion; and a valve mechanism operatively coupled to said operating mechanism to open and close a fluid passageway in response to said operating mechanism, said operating mechanism including a cable release member and a cable pulling member coupled to said cable winding member, said valve mechanism including a switch located on said cable pulling member.

* * * * *